(12) United States Patent
Ohzawa et al.

(10) Patent No.: US 6,690,517 B2
(45) Date of Patent: Feb. 10, 2004

(54) TILT PROJECTION OPTICAL SYSTEM

(75) Inventors: Soh Ohzawa, Toyonaka (JP); Tomiei Kuwa, Osaka (JP)

(73) Assignee: Minolta Co., Ltd., Osaka (JP)

( * ) Notice: Subject to any disclaimer, the term of this patent is extended or adjusted under 35 U.S.C. 154(b) by 7 days.

(21) Appl. No.: 09/975,061

(22) Filed: Oct. 11, 2001

(65) Prior Publication Data

US 2002/0071186 A1 Jun. 13, 2002

(30) Foreign Application Priority Data

Oct. 17, 2000 (JP) ........................................ 2000-316218

(51) Int. Cl.⁷ ................................................ G02B 3/00
(52) U.S. Cl. ........................ 359/649; 359/726; 359/730
(58) Field of Search ................................. 359/649, 650, 359/651, 726–731, 727, 730, 733–36

(56) References Cited

U.S. PATENT DOCUMENTS

| | | | |
|---|---|---|---|
| 5,032,022 A | 7/1991 | Sato et al. | 353/69 |
| 5,042,929 A * | 8/1991 | Tanaka et al. | 359/708 |
| 5,096,288 A | 3/1992 | Yano et al. | 353/69 |
| 5,220,363 A | 6/1993 | Sato et al. | 353/69 |
| 5,302,983 A | 4/1994 | Sato et al. | 353/69 |
| 5,422,691 A | 6/1995 | Ninomiya et al. | 353/69 |
| 5,442,413 A | 8/1995 | Tejima et al. | 353/69 |
| 5,709,445 A | 1/1998 | Takamoto | 353/70 |
| 5,820,240 A | 10/1998 | Ohzawa | 353/70 |
| 5,982,563 A * | 11/1999 | Nakamura et al. | 359/727 |
| 6,144,503 A * | 11/2000 | Sugano | 359/749 |
| 6,473,243 B1 * | 10/2002 | Omura | 359/730 |

FOREIGN PATENT DOCUMENTS

| | | |
|---|---|---|
| JP | 09-179064 A | 7/1997 |
| JP | 10-111474 A | 4/1998 |
| JP | 10-282451 A | 10/1998 |

* cited by examiner

Primary Examiner—Jordan M. Schwartz
Assistant Examiner—Jessica Stultz
(74) Attorney, Agent, or Firm—Sidley Austin Brown & Wood LLP

(57) ABSTRACT

A tilt projection optical system, that performs enlarged projection from the primary image plane on the reduction side to the second image plane on the enlargement side without forming an intermediate real image while being located at an angled position, has, sequentially from the primary image plane side: a refractive lens group including an aperture; a bending mirror that rotates the optical axis for the optical system after said bending mirror by approximately 90 degrees; and an optical group including at least one reflective surface that has a negative power; wherein the construction is such that the radius of the circle that encompasses all the light rays involved in the image formation on the second image plane and that is parallel to the surfaces of each lens of the refracting lens group enlarges once and then converges in terms of its radius on the enlargement side from the aperture of the refracting lens group, and wherein a predetermined condition is met.

48 Claims, 16 Drawing Sheets

TILT PROJECTION OPTICAL SYSTEM

RELATED APPLICATION

This application is based on application No. 2000-316218 filed in Japan, the content of which is hereby incorporated by reference.

FIELD OF THE INVENTION

The present invention relates to a tilt projection optical system, and more particularly to a tilt projection optical system suitable for an image projector that, for example, performs enlarged projection from a primary image plane to a second image plane while being located at an angled position.

Description of the Prior Art

Various image projectors have been proposed that enlarge and project the image displayed on a liquid crystal display or similar apparatus and that perform the enlarged projection from an angled direction so that the screen may be increased in size while the projector itself may be made compact. Specific examples of such devices include a device in which all of the optical elements of the projection optical system comprise reflective mirrors (Japanese Laid-Open Patent Application 10-111474), a device in which all of the optical elements of the projection optical system comprise refracting lenses (Japanese Laid-Open Patent Application 10-282451), and a device that has a projection optical system comprising a combination of reflective mirrors and refracting lenses (Japanese Laid-Open Patent Application 9-179064).

As proposed in Japanese Laid-Open Patent Application 10-111474, if all of the optical elements comprise reflective mirrors, the number of components may be reduced. However, because the reflective mirror does not have the freedom of color aberration correction, the arrangement of the color-synthesizing optical elements (such as three-faced color-synthesizing prisms) is restricted when the construction is such that colors are obtained via multiple liquid crystal display panels. In addition, while it is necessary to form the mirror using plastic in order to obtain a large-diameter curved mirror at a low cost, it is difficult to form a highly efficient reflective coating on the plastic surface. Consequently, if a plastic mirror is used in a projector capable of producing a high level of brightness, the temperature of the mirror increases and the reflective surface thereof deforms, resulting in deterioration in aberrations and durability. In particular, because mirrors close to the aperture are highly sensitive to errors, if a plastic mirror is used in a highly bright projector as any of the mirrors close to the aperture, the performance deterioration due to the deformation of the mirror caused by temperature change is a problem.

As proposed in Japanese Laid-Open Patent Application 10-282451, if all of the optical elements comprise refracting lenses, projection from an angled position may be achieved with optical elements having a relatively small area. However, because a large number of decentered lens groups is required, and some of the lenses thereof must be decentered to a large degree, it is difficult to hold the optical elements together. Where reflective mirrors and refracting lenses are combined, as proposed by Japanese Laid-Open Patent Application 9-179064, the number of decentered lens groups needed is smaller and the construction of the projection optical system is simpler. However, in order to perform projection onto a large screen, a mirror having not only a high power but also a very large area, which is difficult to manufacture, is needed.

SUMMARY OF THE INVENTION

An object of the present invention is to provide an improved tilt projection optical system.

In particular, an object of the present invention is to provide an easy to manufacture, high-performance tilt projection optical system that is sufficiently thin because projection is performed from an angle.

These and other objects are achieved by a tilt projection optical system having the following construction:

a tilt projection optical system that performs enlarged projection from a primary image plane on the reduction side to a second image plane on an enlargement side while being located at an angled position, and that includes, sequentially from the primary image plane, a refracting lens group, a bending mirror, and a group that includes at least one reflective surface having a negative power, wherein the construction is such that (i) the optical system after the bending mirror is rotated by approximately 90 degrees based on the bending of the light path by the bending mirror, (ii) no intermediate real image is formed between the primary image plane and the second image plane, and (iii) the radius of the circle that encompasses all the light rays involved in the image formation on the screen and that is parallel to the surfaces of each lens of the refracting lens group enlarges once and then converges in terms of its radius on the enlargement side from the aperture of the refracting lens group, and wherein the following condition (1) is met:

$$0.35 < Rmin/Rmax < 0.85 \tag{1}$$

where,

Rmax: the maximum value of the radius of the circle that encompasses all the light rays involved in the image formation on the screen and that is parallel to the surfaces of each lens of the refracting lens group, the maximum value being obtained when such circle enlarges in terms of its radius once on the enlargement side from the aperture; and Rmin: the minimum value of the radius of the circle that encompasses all the light rays involved in the image formation on the screen and that is parallel to the surfaces of each lens of the refracting lens group, the minimum value being obtained on the enlargement side from the surface at which the maximum value Rmax is obtained.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

Figure 1:
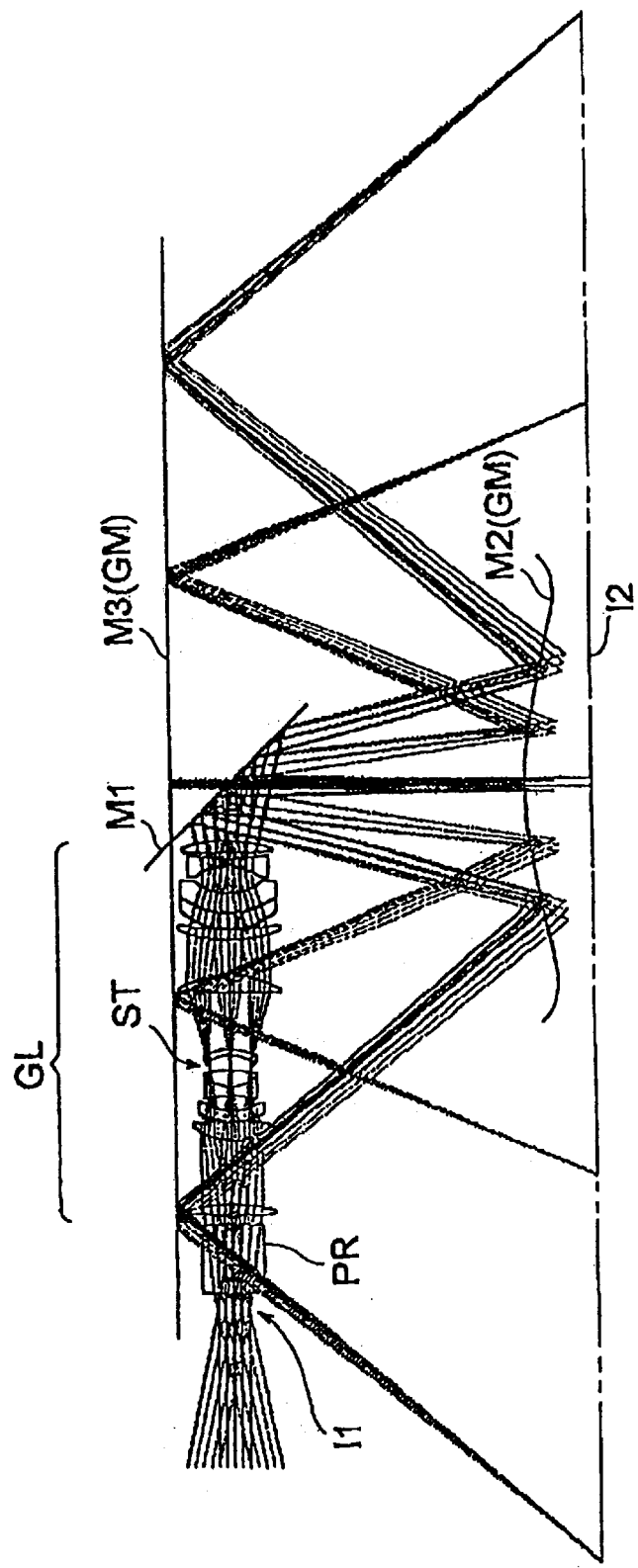
FIG. 1 is an XZ cross-sectional view showing the optical construction and projection light path of a first embodiment.
Figure 2:
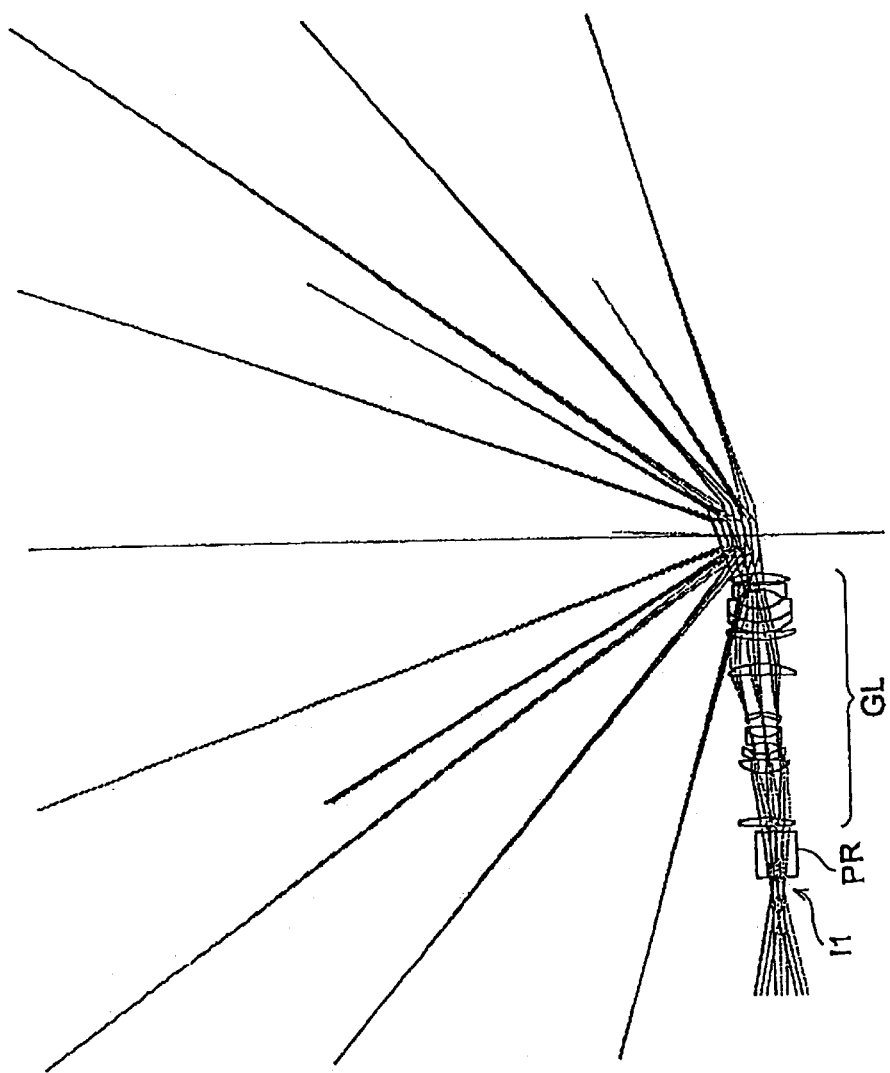
FIG. 2 is a YZ cross-sectional view showing the optical construction and projection light path of the first embodiment.
Figure 3:
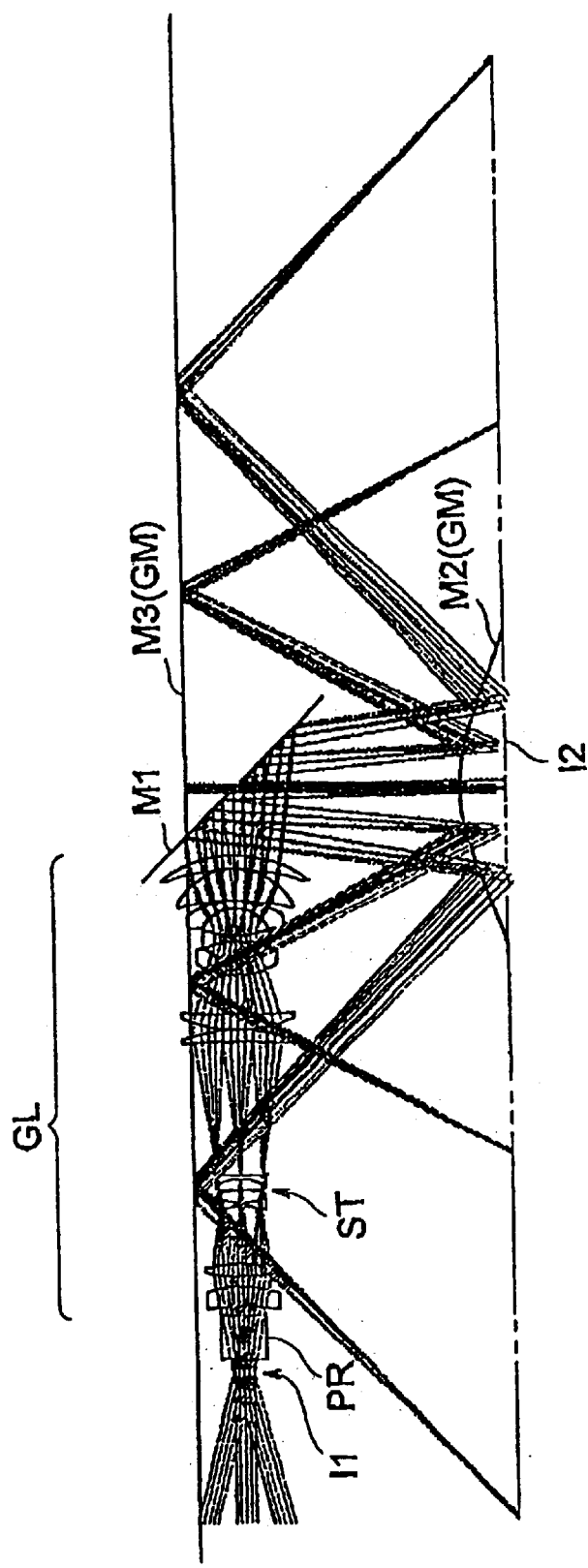
FIG. 3 is an XZ cross-sectional view showing the optical construction and projection light path of a second embodiment.
Figure 4:
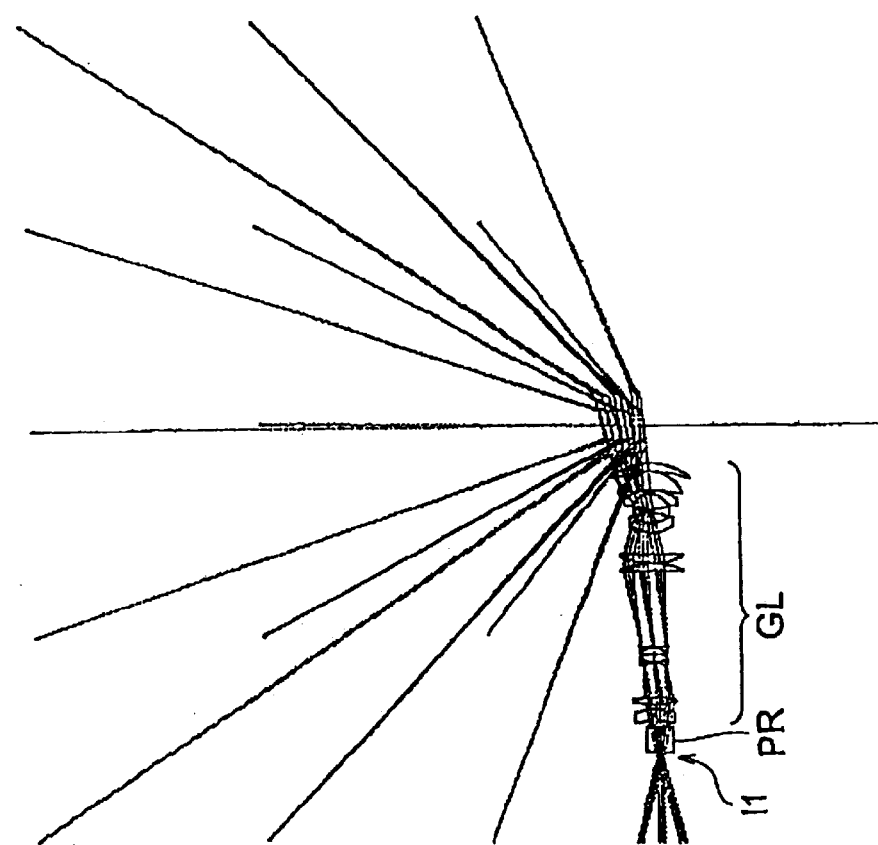
FIG. 4 is a YZ cross-sectional view showing the optical construction and projection light path of the second embodiment.
Figure 5:
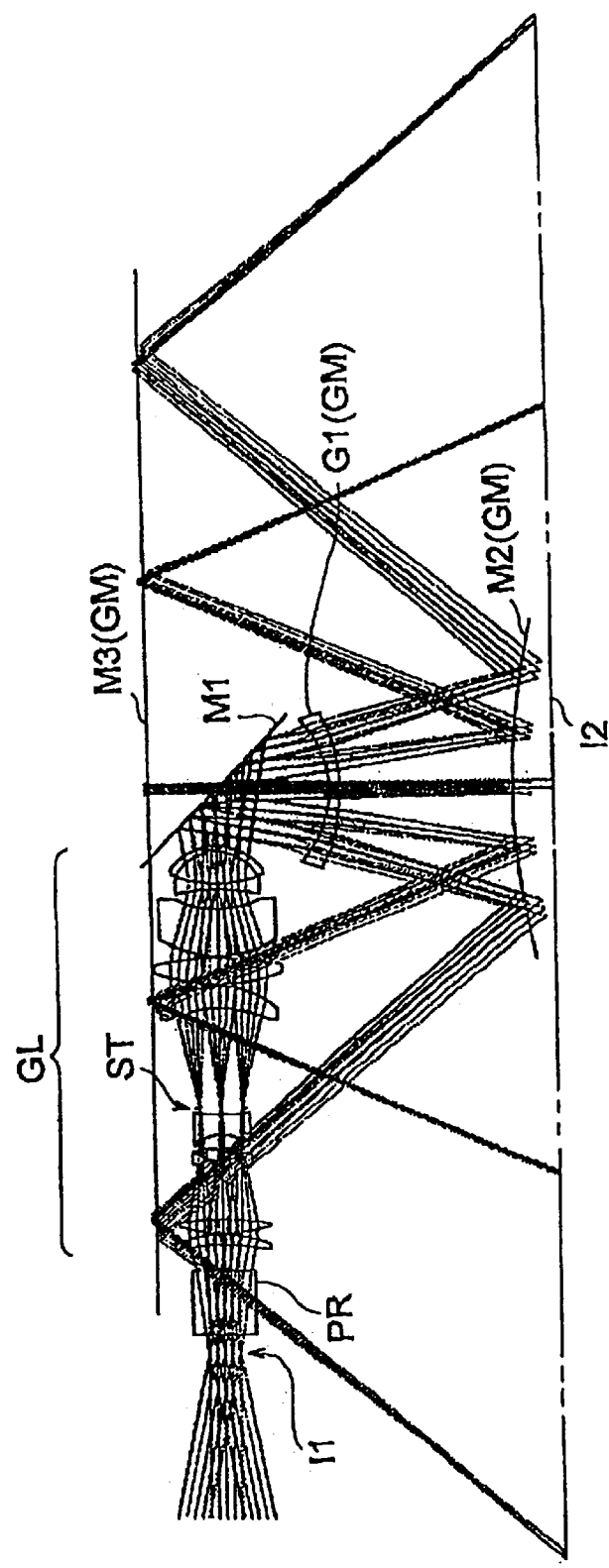
FIG. 5 is an XZ cross-sectional view showing the optical construction and projection light path of a third embodiment (third numerical example)
Figure 6:
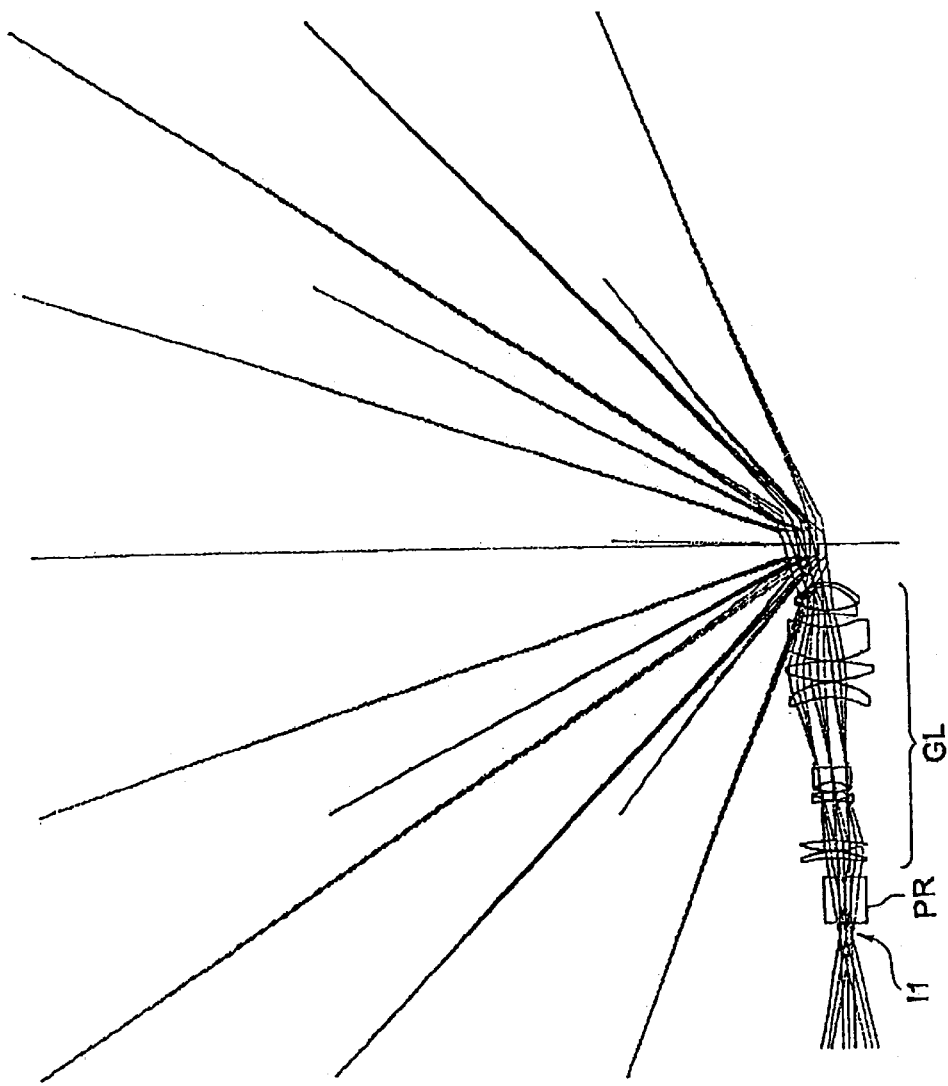
FIG. 6 is a YZ cross-sectional view showing the optical construction and projection light path of the third embodiment (third numerical example)
Figure 7:
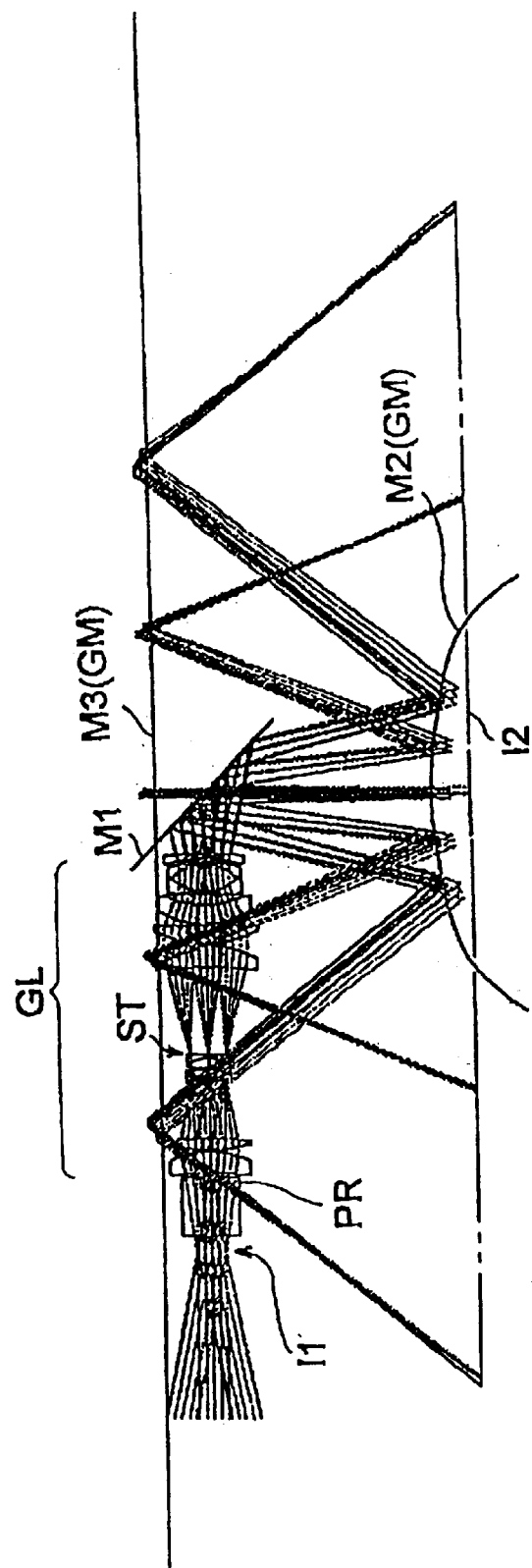
FIG. 7 is an XZ cross-sectional view showing the optical construction and projection light path of a fourth embodiment (fourth numerical example)
Figure 8:
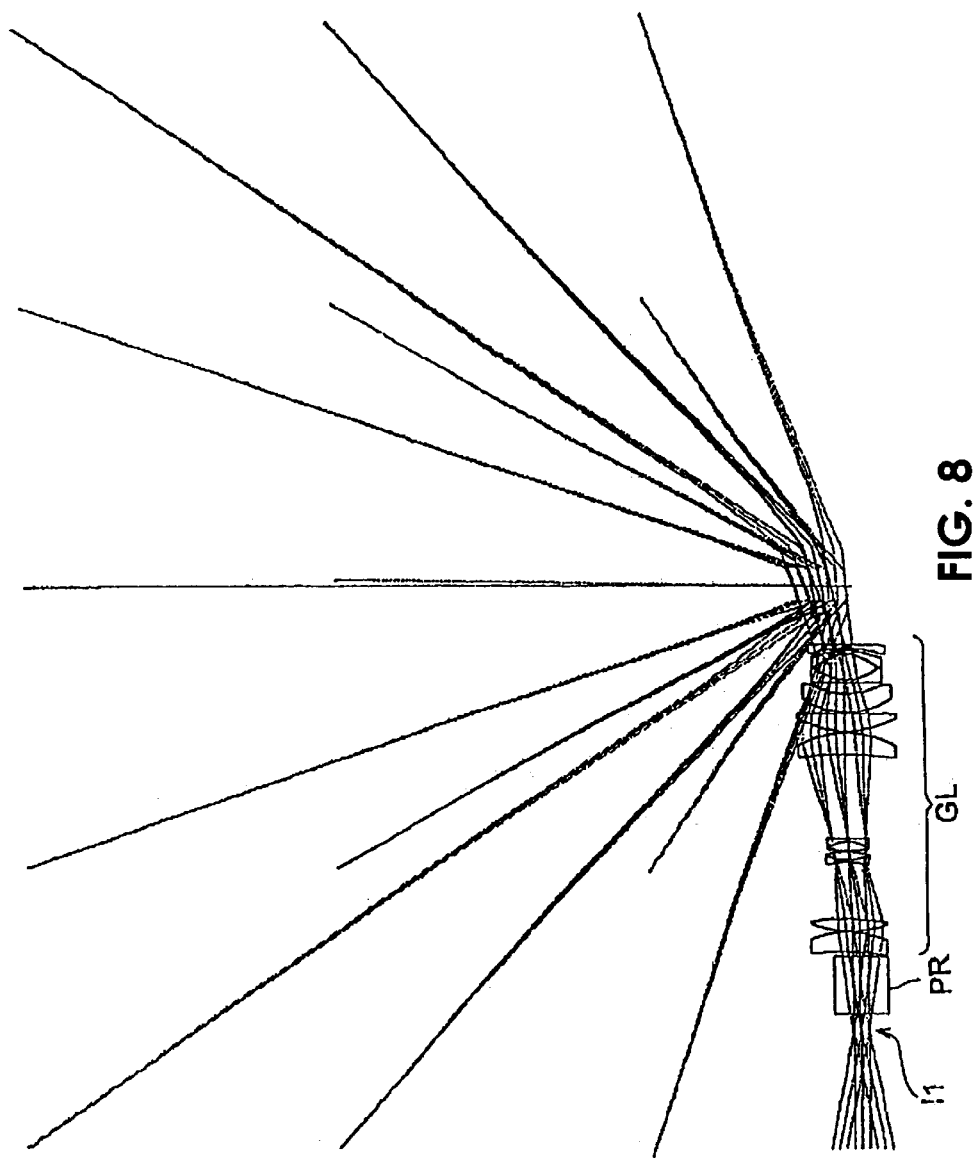
FIG. 8 is a YZ cross-sectional view showing the optical construction and projection light path of the fourth embodiment (fourth numerical example)
Figure 9:
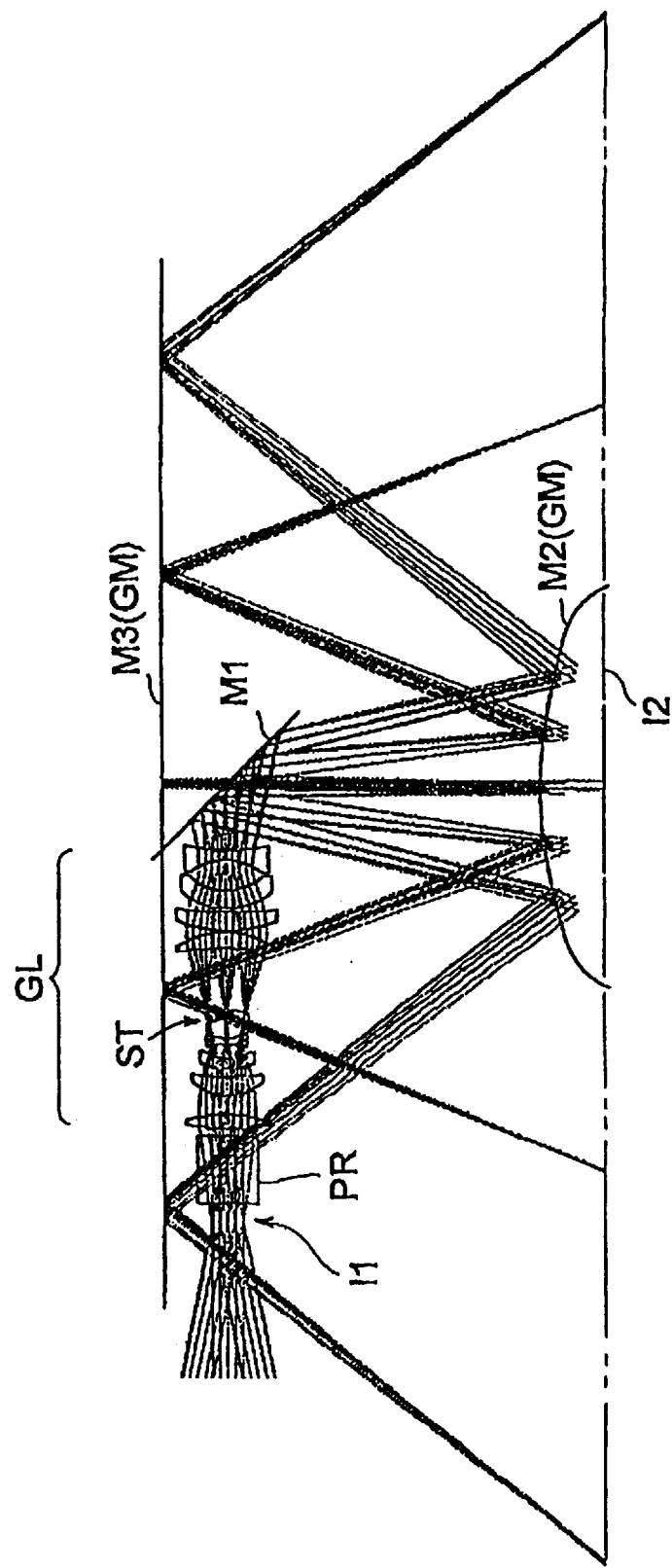
FIG. 9 is an XZ cross-sectional view showing the optical construction and projection light path of a fifth embodiment (fifth numerical example)
Figure 10:
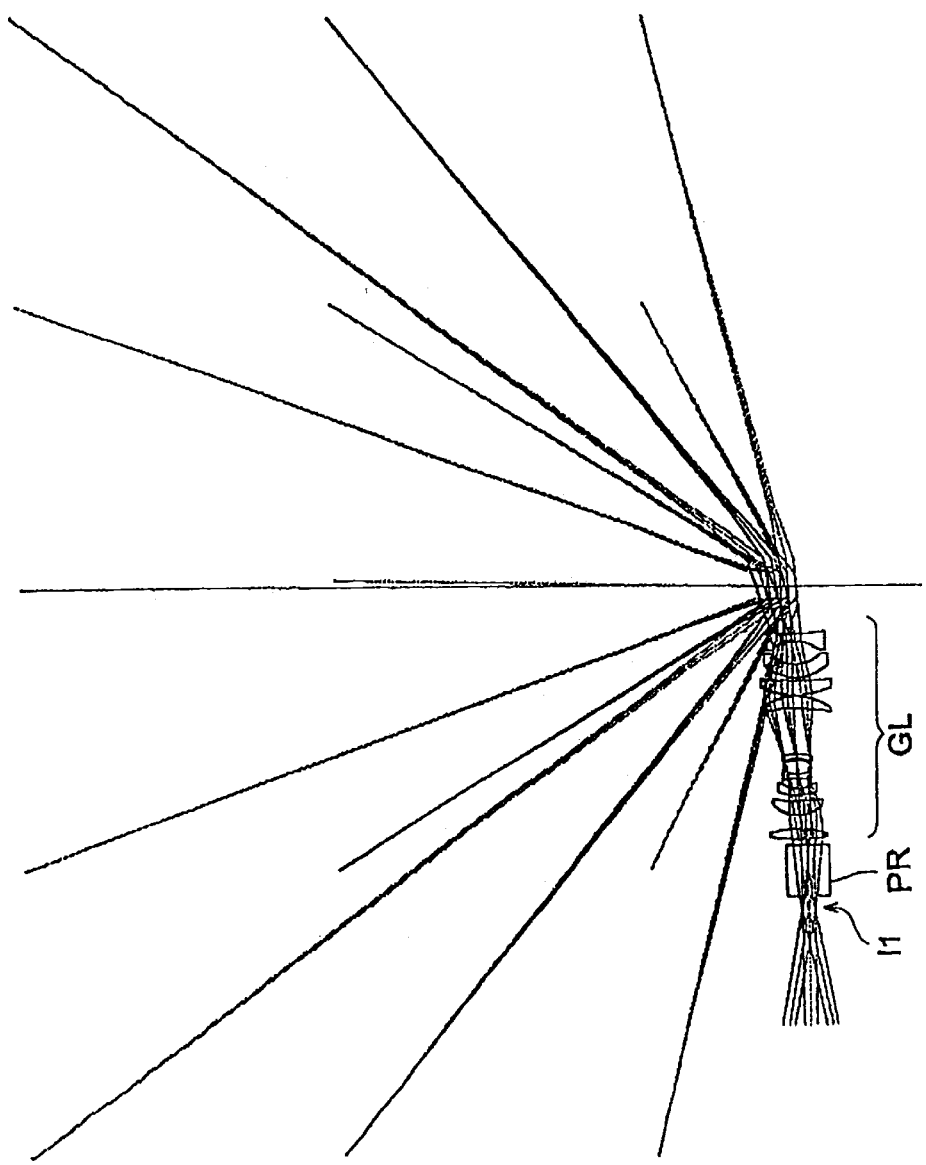
FIG. 10 is a YZ cross-sectional view showing the optical construction and projection light path of the fifth embodiment (fifth numerical example)
Figure 11:
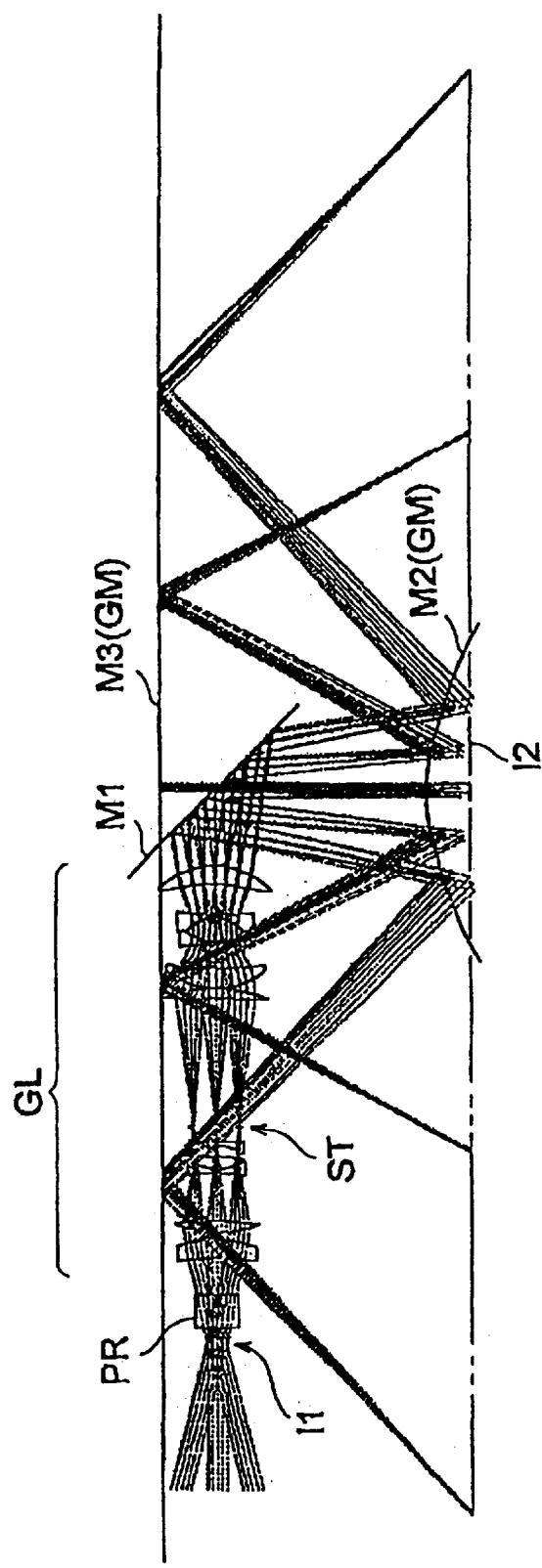
FIG. 11 is an XZ cross-sectional view showing the optical construction and projection light path of a sixth embodiment (sixth numerical example)
Figure 12:
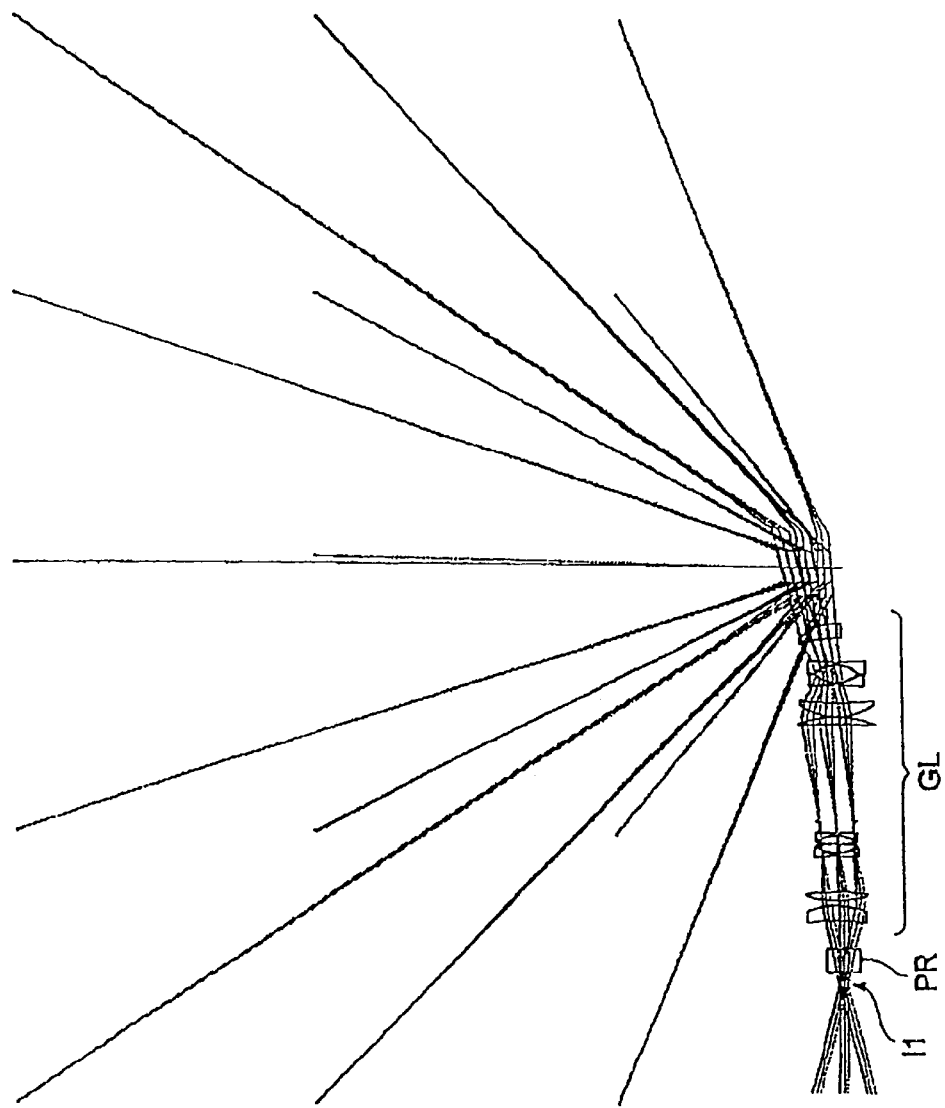
FIG. 12 is a YZ cross-sectional view showing the optical construction and projection light path of the sixth embodiment (sixth numerical example)
Figure 13:
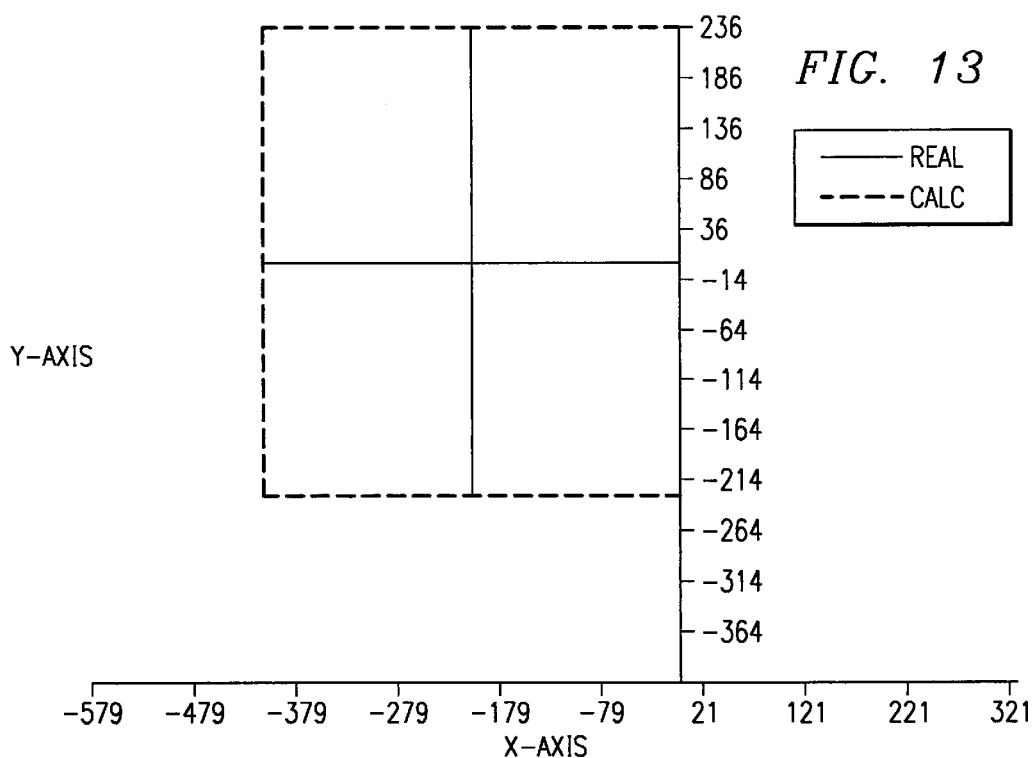
FIG. 13 is a distortion diagram of the first embodiment.
Figure 14:
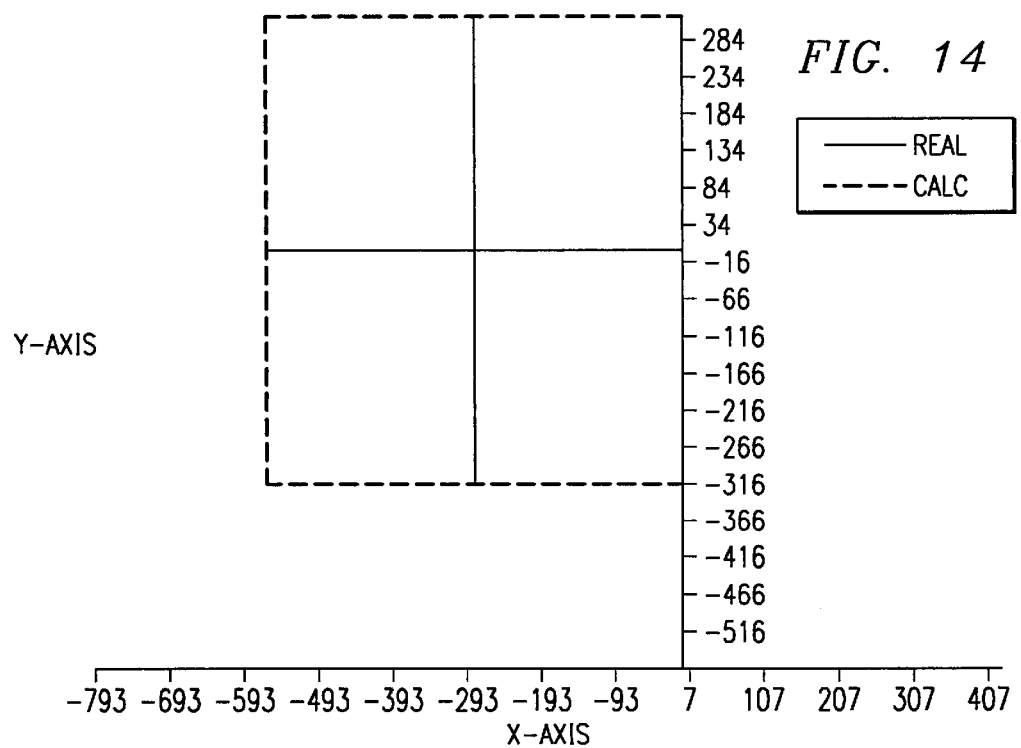
FIG. 14 is a distortion diagram of the second embodiment.
Figure 15:
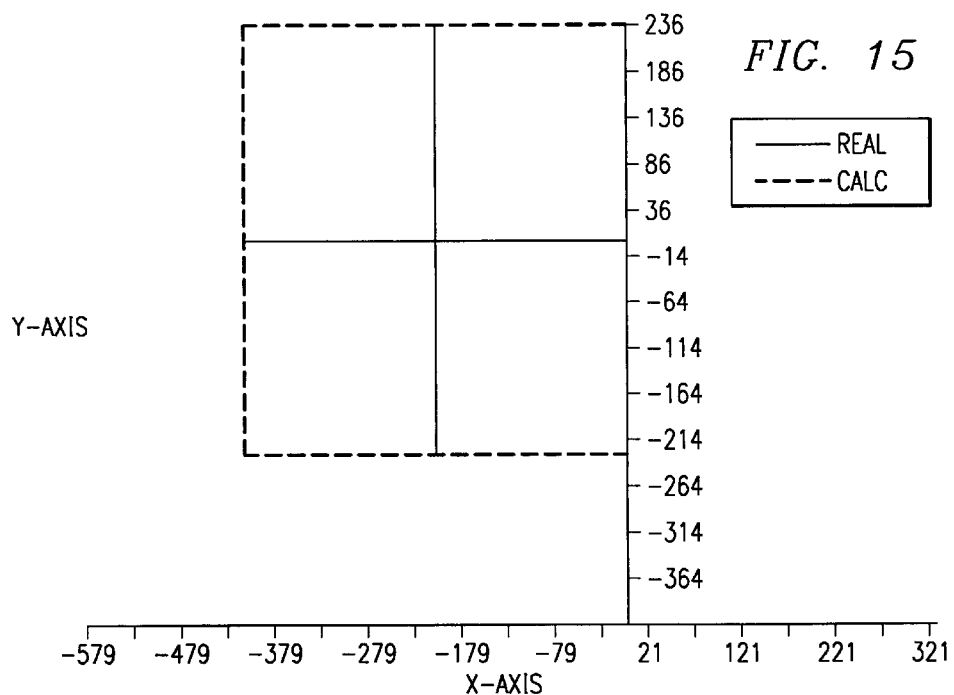
FIG. 15 is a distortion diagram of the third embodiment.
Figure 16:
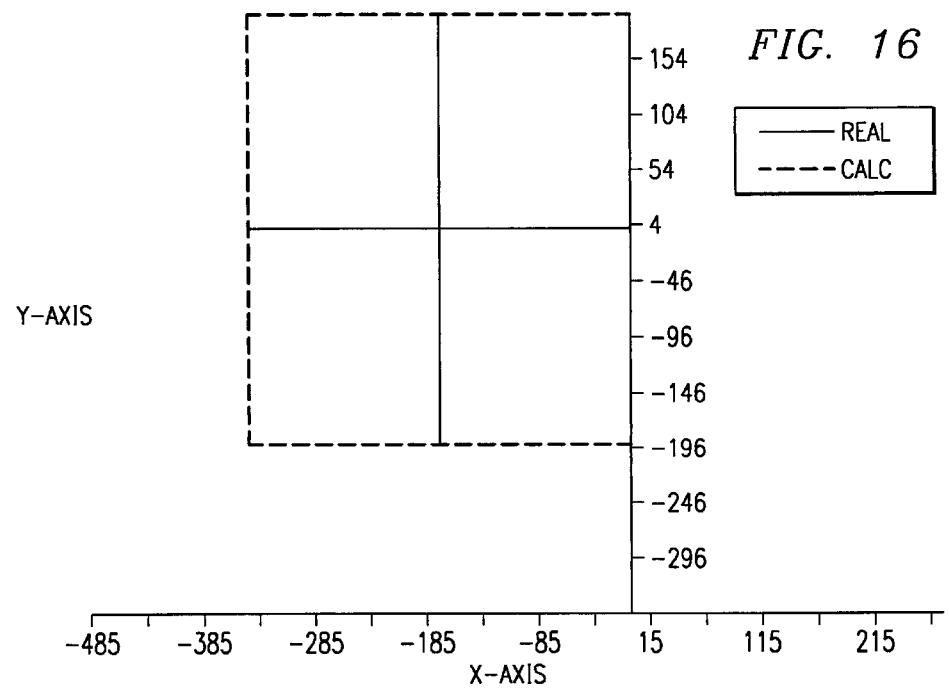
FIG. 16 is a distortion diagram of the fourth embodiment.
Figure 17:
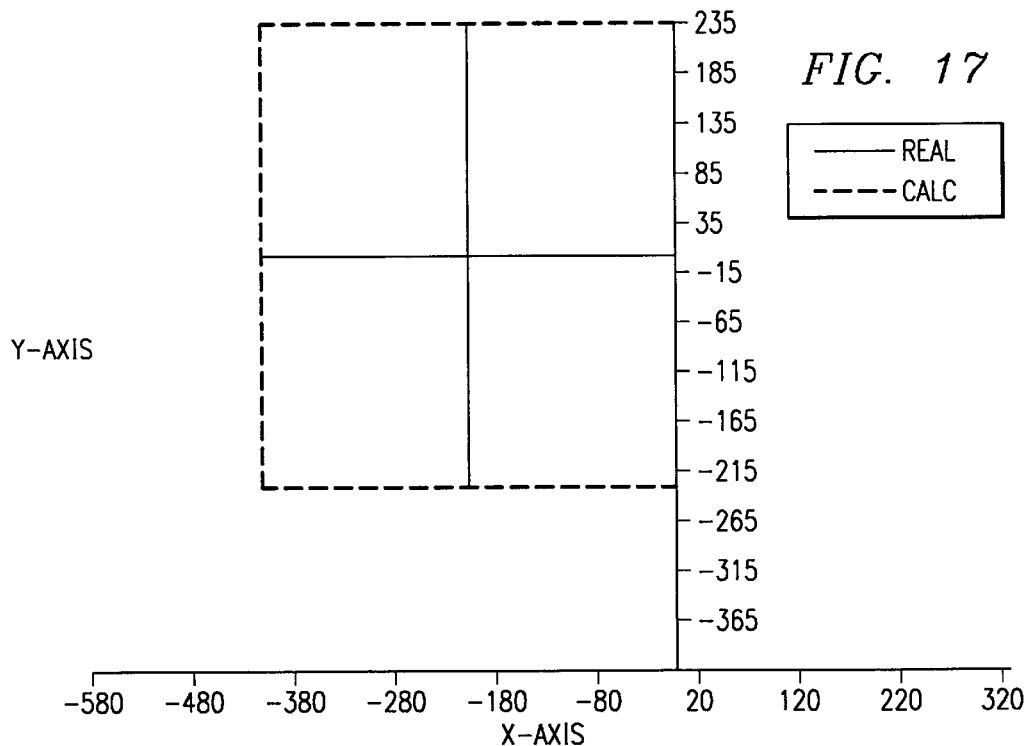
FIG. 17 is a distortion diagram of the fifth embodiment.
Figure 18:
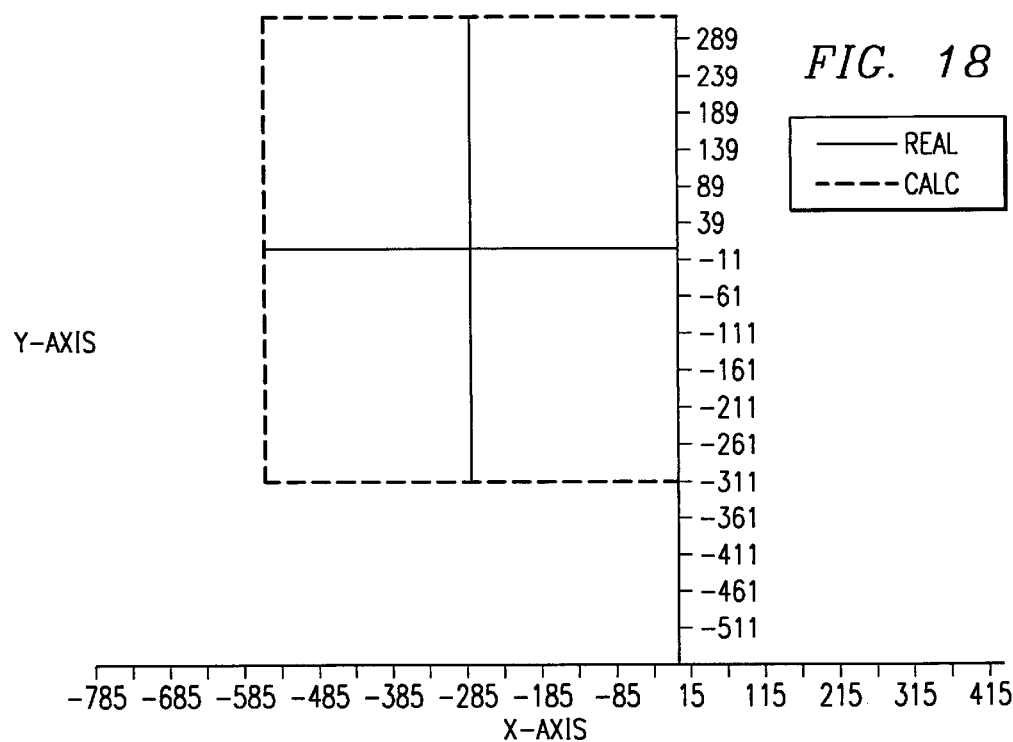
FIG. 18 is a distortion diagram of the sixth embodiment.

The embodiments of the tilt projection optical system of the present invention are explained below with reference to the drawings. FIGS. 1 through 12 respectively show the optical construction and projection light path of the first through sixth embodiments. FIGS. 1, 3, 5, 7, 9, and 11 show the XZ cross-section in a rectangular coordinate system (X, Y, Z), and FIGS. 2, 4, 6, 8, 10 and 12 show the YZ cross-section in the same rectangular coordinate system (X, Y, Z). The surface of the prism (PR) on the side of the primary image plane (I1) is parallel to the XY surface.

Each embodiment comprises a tilt projection optical system for an image projector that performs enlarged projection from an angled position, in which the image is projected from the primary image plane (I1), on which the image is reduced, to the second image plane (I2), on which the image is enlarged. Therefore, the primary image plane (I1) corresponds to the display surface of the display element (such as an LCD, for example) that displays the two-dimensional image, and the second image plane (I2) corresponds to the projection image surface (i.e., the screen surface). It is possible to use each embodiment in an image reading device as a tilt projection optical system that performs reduced projection from the second image plane (I2) to the primary image plane (I1) while being located at an angle. In such a case, the primary image plane (I1) corresponds to the light receiving surface of the light receiving element (such as a CCD, or Charge Coupled Device, for example) that performs reading of the image and the second image plane (I2) corresponds to the image surface which is read (i.e., the original image surface, such as film).

Each embodiment includes, sequentially from the primary image plane (I1) side (i.e., the reduction side), a prism (PR), a refracting lens group (GL), a first mirror (M1), a second mirror (M2) and a third mirror (M3). The refracting lens group (GL) comprises multiple lenses and an aperture (ST).

The reflective surfaces of the first and third mirrors (M1, M3) each comprise a flat surface, and the reflective surface of the second mirror (M2) has a negative power and comprises a free-form surface. In each of the embodiments, a mirror group (GM), that includes at least one reflective surface having a negative power, is located on the second image plane (I2) side of the first mirror (M1). The mirror group (GM) includes the second and third mirrors (M2, M3); and in the third embodiment (FIG. 5), one lens (G1) located between the first and second mirrors (M1, M2) is also included. When the optical elements are arranged sequentially from the primary image plane (I1) to the second image plane (I2) in the order of multiple refracting lens surfaces, a flat reflective surface to bend the light path and a negative power reflective surface in this way, the projection optical system can be made wide-angled and thin thanks to the negative power reflective surface.

Because the first mirror (M1) is a bending mirror, in each embodiment, the optical system after the first mirror (M1) is rotated by approximately 90 degrees due to the bending of the light path by the first mirror (M1). Where the optical system after the first mirror (M1) is rotated by approximately 90 degrees in this way, the refracting lens group (GL) may be located parallel to the second image plane (I2). Consequently, even if the refracting lens group (GL) is long, the thickness of the projection optical system as a whole may be reduced. In addition, in each embodiment the construction is such that no intermediate real image is formed between the primary image plane (I1) and the second image plane (I2), and the radius of the circle that encompasses all the light rays involved in the image formation on the screen and that is parallel to the surfaces of each lens of the refracting lens group (GL) enlarges once and then converges in terms of its radius on the enlargement side from the aperture (ST) of the refracting lens group (GL). Because no intermediate real image is formed between the primary image plane (I1) and the second image plane (I2), the length of the projection optical system as a whole may be reduced.

In addition to the construction in which the radius of the circle that encompasses all the light rays involved in the image formation on the screen and that is parallel to the surfaces of each lens of the refracting lens group (GL) enlarges once and then converges in terms of its radius on the enlargement side from the aperture (ST) of the refracting lens group (GL), it is preferred that the following condition (1) be met:

$$0.35 < Rmin/Rmax < 0.85 \tag{1}$$

where,

Rmax: the maximum value of the radius of the circle that encompasses all the light rays involved in the image formation on the screen and that is parallel to the surfaces of each lens of the refracting lens group (GL), the maximum value being obtained when the above circle enlarges in terms of its radius once on the enlargement side from the aperture (ST); and Rmin: the minimum value of the radius of the circle that encompasses all the light rays involved in the image formation on the screen and that is parallel to the surfaces of each lens of the refracting lens group (GL), the minimum value being obtained on the enlargement side from the surface at which the maximum value Rmax is obtained.

Where the ratio Rmin/Rmax is under the lower limit of the condition (1), the maximum value Rmax becomes large, resulting in an excessively large effective diameter in the middle of the refracting lens group (GL) and consequently a large lens mount diameter, which makes it difficult to reduce the thickness of the projection optical system. In addition, because it is necessary to substantially bend the light rays so that the light that has spread to the maximum value Rmax rapidly converges to the minimum value Rmin, it becomes difficult to prevent the occurrence of image plane curvature. Conversely, where the ratio Rmin/Rmax exceeds the upper limit of the condition (1), the minimum value Rmin becomes too large, resulting in a large width of the light involved in image formation emitted from the refracting lens group (GL), which makes it difficult to bend the light path at the flat reflective surface of the first mirror (M1). In addition, the maximum value Rmax becomes too small, which makes it difficult to correct the color aberration that occurs in the lenses located on the primary image plane (I1) side (the reduction side) from the aperture (ST) using the lenses located on the second image plane (I2) side (the enlargement side) from the aperture (ST).

It is preferred that the reflective surface having a negative power not have an axis of rotational symmetry as with the reflective surface of the second mirror (M2) in each embodiment. If the negative power reflective surface located between the bending first mirror (M1) and the second image plane (I2) does not have an axis of rotational symmetry, the freedom in distortion correction increases, such that distortion may be corrected well. In addition, it is preferred that the refracting lens group (GL) comprises lenses that share a single axis. If the refracting lens group (GL) comprises lenses that share a single axis, the refracting lens group (GL) remains rotationally symmetrical, as in the conventional art, which makes the lenses and lens mount easy to manufacture, thereby reducing costs.

It is preferred that the refracting lens group (GL) includes on the second image plane (I2) side from the aperture (ST) a lens group that includes at least one positive lens, a lens having a concave surface on the enlargement side, and a negative lens that is located next to the above concave surface and has a concave surface on the reduction side, which are located sequentially from the primary image plane (I1) side as in each embodiment. By spreading the light involved in image formation that has converged using the above two concave surfaces, the refracting lens group (GL) may be made sufficiently wide-angled, and correction of image plane curvature may be effectively achieved.

It is preferred that the refracting lens group (GL) includes a surface that is not rotationally symmetrical. This construction enables the coma aberration at the screen-center image to be corrected and the number of lenses in the refracting lens group (GL) to be reduced, thereby allowing the projection optical system to be made thinner and the cost thereof further reduced. It is further preferred that the refracting lens group (GL) includes a decentered lens. Using this construction, the same effect may be obtained as when a surface that is not rotationally symmetrical is included. Moreover, it is preferred that the construction be telecentric on the primary image plane (I1) side (i.e., the reduction side). Where the construction is telecentric on the reduction side, even if the LCD is located on the primary image plane (I1) side, projection with no unevenness in color and good contrast may be achieved.

It is preferred that the first mirror (M1), which comprises a bending mirror that bends the light path, and the second mirror (M2), which is a mirror with a negative power and is a component of a mirror group (GM) on the enlargement side from the first mirror, be coated on the surface with a coating that increases reflection. In addition, it is further preferred that using an angled coating comprising a dielectric material, the bending first mirror (M1) be coated with a reflection-increasing coating that changes thickness depending on the position on the mirror surface. By using a reflection-increasing coating that changes thickness depending on the position on the coated surface, a change in spectral reflectance, which occurs due to the fact that the angle at which the light strikes the mirror's reflective surface from the refracting lens group (GL) varies depending on the position of the surface, may be prevented. Therefore, the occurrence of unevenness in color may be prevented, and the amount of projected light may be increased for brighter images. Specifically, it is preferred that the construction be such that the thickness of the reflection-increasing coating increase as the angle of incidence regarding the mirror's reflective surface increases. In other words, it is preferred that the construction be such that the reflection-increasing coating of the bending first mirror (M1) becomes thicker as the distance to the refracting lens group (GL) increases, and that the reflection-increasing coating of the second mirror (M2) with a negative power becomes thicker as the second image plane (I2) becomes closer.

It is preferred that the construction be such that the angle of the bending mirror that is located between the refracting lens group (GL) and the negative power reflective surface, i.e., the first mirror (M1), is adjustable. If the angle of the first mirror (M1) is adjustable, errors in the positions of the refracting lens group (GL) and the second mirror (M2) may be corrected through adjustment of the angle of the first mirror (M1). At the same time, it is preferred that the construction be such that the mirror having a negative power reflective surface, i.e., the second mirror (M2), may be moved in a parallel fashion and such that the angle thereof is adjustable. Using this construction, the position of the second image plane (I2) can be adjusted through the parallel movement of the second mirror (M2), and the distortion that occurs due to screen angle error, etc., which occurs during manufacturing, may be corrected through adjustment of the angle of the second mirror (M2).

In order to effectively reduce the thickness of the projection optical system while maintaining high optical performance, it is further preferred that the following condition (2) be met:

$$0.70 < La/Lt < 0.93 \qquad (2)$$

where,

La: the distance between the screen center position of the primary image plane (I1) and the screen center position of the second image plane (I2) and that extends along the short edge of the screen of the second image plane (I2); and Lt: the length of the short edge of the screen of the second image plane (I2).

Where the ratio La/Lt is below the lower limit of the condition (2), the refracting lens group (GL) is too close to the bottom part of the second image plane (I2), and it becomes difficult to place a bending mirror, which comprises the first mirror (M1), in the projection optical system. In addition, because it is necessary to reduce the effective area of the negative power reflective surface, which comprises the reflective surface of the second mirror (M2), distortion correction becomes difficult. Conversely, where the ratio La/Lt exceeds the upper limit of the condition (2), the distance between the screen center of the primary image plane (I1) and the screen center of the second image plane (I2) increases, and a large space is needed under the second image plane (I2). As a result, the projection optical system loses compactness, or the angle with which projection is made onto the second image plane (I2) increases, resulting in difficulty in correcting the nonsymmetrical distortion that occurs along the short edge of the second image plane (I2) or the slanting of the image plane.

Where the light that reaches from the screen center of the primary image plane (I1) to the screen center of the second image plane (I2) via the center of the aperture (ST) is deemed the 'screen center light', it is further preferred that the following condition (3) be met:

$$0.30<OP1/OP2<0.45 \quad (3)$$

where,

OP1: the length of the light path of the screen center light that begins from the surface included in the refracting lens group (GL) and closest to the bending mirror, which comprises the first mirror (M1) in each embodiment, and extends to the negative power reflective surface, which comprises the reflective surface of the second mirror (M2) in each embodiment; and OP2: the length of the light path of the screen center light that begins from the negative power reflective surface, which comprises the reflective surface of the second mirror (M2) in each embodiment, and extends to the second image plane (I2).

Where the ratio OP1/OP2 is below the lower limit of the condition (3), the distance from the refracting lens group (GL) to the negative power reflective surface is too small, and it is difficult to place a bending mirror therein. Conversely, where the ratio OP1/OP2 exceeds the upper limit of the condition (3), the bending mirror increases in size if the entire projection optical system is to be made thin, which results in increased cost.

The tilt projection optical system of the present invention is more specifically explained below using construction data, etc. The numerical examples 1 through 6 shown below respectively correspond to the first through sixth embodiments explained above, and the drawings showing each embodiment (FIGS. 1 through 12) show the light path, etc., of the corresponding numerical example.

The construction data for each numerical example pertain to a system from the primary image plane (I1) on the reduction side, which corresponds to the object plane in enlarged projection, to the second image plane (I2) on the enlargement side, which corresponds to the image plane in enlarged projection, and the ith surface from the reduction side is expressed as si(i=0, 1, 2, 3, . . .), and ri(i=0, 1, 2, 3, . . .)is the radius (mm) of curvature of the surface si. In addition, di (i=0, 1, 2, 3 . . . ) indicates the ith axial distance from the reduction side (expressed in terms of millimeters, and the distance between decentered surfaces is shown as decentering data), and Ni (i=1, 2, 3, . . . ) and vi (i×1, 2, 3, . . . ) respectively indicate the refractive index (Nd) regarding the d-line and the Abbe number (vd) of the ith optical element from the reduction side.

Regarding surfaces that are decentered relative to the surface immediately before them on the reduction side, the decentering data are shown based on the global rectangular coordinate system (X, Y, Z). In the rectangular coordinate system (X, Y, Z), the position of the surface that is parallely decentered is expressed in terms of an apex of surface coordinate system (XDE, YDE, ZDE)={the parallely decentered position on the X axis (mm), the parallely decentered position on the Y axis (mm), the parallely decentered position on the Z axis (mm)}, which has the center position of the first surface (s1) that is parallel to the XY plane as the original point (0, 0, 0), and the gradient of the surface (rotationally decentered position) is expressed in terms of the angle of rotation around each axis of X, Y and Z with the apex of surface of that surface deemed the center, i.e., ADE, BDE, CDE(°). The order of decentering is XDE, YDE, ZDE, ADE, BDE and CDE.

The surface si with an asterisk is an aspherical surface that is symmetrical across an axis, and the configuration of the surface is defined by the equation (ASP) below that uses a local rectangular coordinate system (x, y, z) in which the apex of surface is deemed the original point. The surface si with a dollar sign is a free-form surface, and the configuration of the surface is defined by the equation below (XYP) that uses a local rectangular coordinate system (x, y, z) in which the apex of surface is deemed the original point. The aspherical data and free-form surface data are shown with other data.

$$Z=(ch^2)/[1+\sqrt{\{1-(1+K)c^2h^2\}}+(Ah^4+Bh^6+Ch^8+Dh^{10}+Eh^{12}+Fh^{14})- \quad (ASP)$$

where,

Z: the amount of disposition at height h from the reference surface and along the z axis;

h: the height in the direction perpendicular to the z axis ($h2=x2+y2$);

c: the paraxial curvature (=1/radius of curvature);

A, B, C, D, E, F: aspherical coefficients;

K: the conic constant; and

C(m, n): the free-form surface coefficient (m, n=0, 1, 2, . . .).

Figure 19:
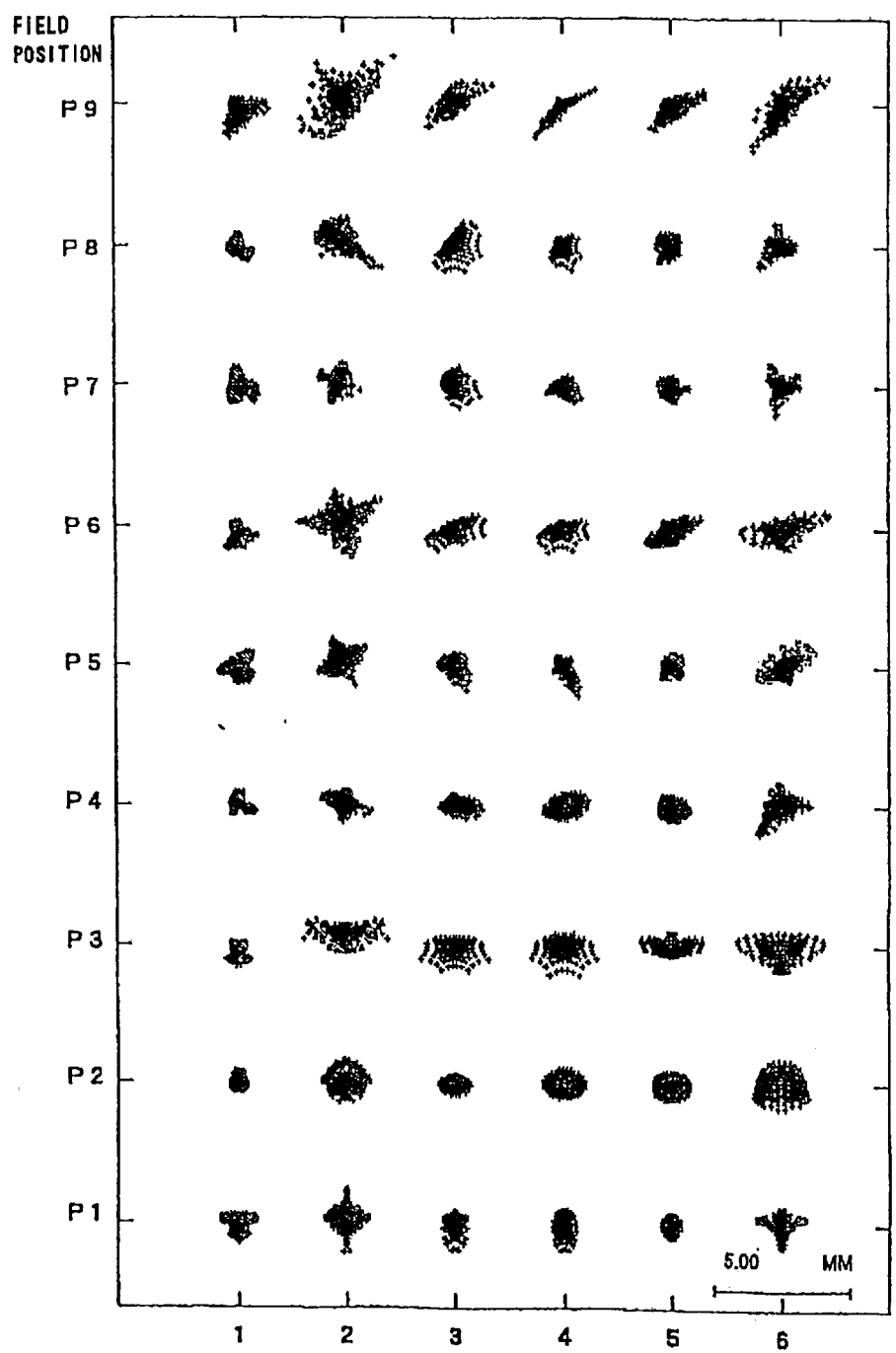
FIG. 19 is a spot diagram regarding each embodiment.

The optical performance of each numerical example is shown using distortion diagrams (FIGS. 13 through 18) and a spot diagram (FIG. 19). The distortion diagram shows the position of the light (mm) on the second image plane (I2) that corresponds to a rectangular lattice on the primary image plane (I1). The solid lines indicate the distorted lattice of the example and the dotted lines indicate the lattice of ideal image points (with no distortion) taking into account the anamorphic ratio. The spot diagram shows the image formation characteristic (mm) on the second image plane (I2) with regard to the three frequencies of d-line, g-line and c-line.

Where the x axis runs along the long edge of the screen of the primary image plane (I1) (the same direction as the X axis) and the y axis runs along the short edge of the screen of the primary image plane (I1) (the same direction as the Y axis), the object height (mm) that corresponds to each field position is expressed using a local rectangular coordinate system (x, y) in which the center of the screen of the primary image plane (I1) is deemed the original point. Where the x' axis runs along the long edge of the screen of the second image plane (I2) and the y' axis runs along the short edge of the screen of the second image plane (I2), each image height (mm) is expressed using a local coordinate system (x', y') in which the center of the screen of the second image plane (I2) is deemed the original point. Therefore, each distortion diagram shows the state of distortion of the real image on the second image plane (I2) seen from a direction perpendicular to the x'-y' plane (only the negative side of x', however). Because all of the examples are symmetrical as to the YZ plane except for the bending first mirror (M1) that has a flat reflective surface, only the spot and distortion evaluation object points on one side of the screen relative to the YZ plane are shown. However, the light path drawing is shown using light rays that include the evaluation object points that are symmetrical as to the YZ plane, and calculation is made for the data (Rmax, Rmin) associated with the condition (1) using light rays that include the evaluation object points that are symmetrical as to the YZ plane. The evaluation object point (x, y) for each field position is shown in terms of the object height (mm) on the primary image plane (I1), and the values that meet the conditions and the associated data regarding each numerical example are shown in Table 1.

| [surface] | [Radius of Curvature] | [Axial Distance] | [Refractive Index] | [Abbe Number] |
|---|---|---|---|---|
| | | [Example 1] | | |
| s0(I1) | r0 = ∞ | | | |
| | | d0 = 9.614 | | |
| PR ... | | | | |
| s1 | r1 = ∞ | | | |
| | | d1 = 36.000 | N1 = 1.805180 | ν1 = 25.432 |
| s2 (GL) ... | r2 = ∞ | | | |
| s3 | r3 = 389.137 | | | |
| | XDE = 0.000,YDE = 7.377,ZDE = 41.000 | | | |
| | ADE = 0.000,BDE = 0.000,CDE = 0.000 | | | |
| | | d3 = 6.000 | N2 = 1.846660 | ν2 = 23.8227 |
| s4 | r4 = −92.289 | | | |
| | | d4 = 34.944 | | |
| s5 | r5 = 32.501 | | | |
| | | d5 = 10.000 | N3 = 1.493100 | ν3 = 83.5763 |
| s6 | r6= −251.781 | | | |
| | | d6 = 0.200 | | |
| s7 | r7 = 38.432 | | | |
| | | d7 = 5.000 | N4 = 1.492700 | ν4 = 57.4912 |
| s8* | r8 = 26.462 | | | |
| | | d8 = 8.184 | | |
| s9 | r9 = −59.813 | | | |
| | | d9 = 5.000 | N5 = 1.805180 | ν5 = 25.4321 |
| s10 | r10 = 20.208 | | | |
| | | d10 = 9.000 | N6 = 1.754500 | ν6 = 51.5721 |
| s11 | r11 = −79.475 | | | |
| | | d11 = 2.499 | | |
| s12(ST) | r12 = ∞(Radius of aperture = 11.176 mm) | | | |
| | | d12 = 5.000 | | |
| s13 | r13 = −25.320 | | | |
| | | d13 = 3.000 | N7 = 1.805180 | ν7 = 25.4321 |
| s14 | r14 = −34.917 | | | |
| | | d14 = 30.471 | | |
| s15 | r15 = −1766.064 | | | |
| | | d15 = 9.000 | N8 = 1.805180 | ν8 = 25.4321 |
| s16 | r16= −60.027 | | | |
| | | d16 = 19.059 | | |
| s17 | r17 = 68.326 | | | |
| | | d17 = 6.000 | N9 = 1.850000 | ν9 = 40.0377 |
| s18 | r18 = 152.914 | | | |
| | | d18 = 0.200 | | |
| s19 | r19 = 41.251 | | | |
| | | d19 = 8.000 | N10 = 1.688930 | ν10 = 31.1592 |
| s20 | r20 = 45.804 | | | |
| | | d20 = 10.000 | N11 = 1.754500 | ν11 = 51.5721 |
| s21 | r21 = 25.796 | | | |
| | | d21 = 15.276 | | |
| s22 | r22 = −28.893 | | | |
| | | d22 = 3.5000 | N12 = 1.805180 | ν12 = 25.4321 |
| s23 | r23 = 160 .726 | | | |
| | | d23 = 2.627 | | |
| s24 | r24 = 388.180 | | | |
| | | d24 = 6.500 | N13 = 1.492700 | ν13 = 57.4912 |
| s25* | r25 = −90.786 | | | |
| s26(M1) | r26 = ∞ | | | |
| | XDE = 0.000,YDE = 7.377,ZDE = 270.459 | | | |
| | ADE = 0.000,BDE = −45.000,CDE = 0.000 | | | |
| s27$(M2) | r27 = ∞ | | | |
| | XDE = −163.000,YDE = 7.377,ZDE = 270.459 | | | |
| | ADE = 0.000,BDE = −90.000,CDE = 0.000 | | | |
| s28(M3) | r28 = ∞ | | | |
| | XDE = 30.000,YDE = 257.377,ZDE = 270.459 | | | |
| | ADE = 0.000,BDE = −90.000,CDE = 0.000 | | | |
| s29(I2) | r29 = ∞ | | | |
| | XDE = −200.000,YDE = 357.377,ZDE = 270.459 | | | |
| | ADE = 0.000,BDE = −90.000,CDE = 0.000 | | | |

[Aspherical Data of 8th Surface (s8)]

$K = 0.0000$,
$A = 0.323962 \times 10^{-5}, B = 0.661895 \times 10^{-8}, C = -0.204368 \times 10^{-10}$,
$D = 0.348804 \times 10^{-12}, E = -0.149873 \times 10^{-14}, F = 0.292638 \times 10^{-17}$ -continued

| [surface] | [Radius of Curvature] | [Axial Distance] | [Refractive Index] | [Abbe Number] |
|---|---|---|---|---|

[Aspherical Data of 25th Surface (s25)]

K = 0.0000,
A = $-0.156512 \times 10^{-5}$, B = $-0.202291 \times 10^{-8}$, C = $0.394682 \times 10^{-11}$,
D = $-0.124846 \times 10^{-13}$, E = $0.186023 \times 10^{-16}$, F = $-0.110946 \times 10^{-19}$

[Free Form Surface Data of 27th Surface (s27)]

K = 0.0000,
C(0,1) = $-9.4352 \times 10^{-3}$, C(2,0) = $-2.6872 \times 10^{-3}$, C(0,2) = $-2.3468 \times 10^{-3}$,
C(2,1) = $9.5042 \times 10^{-6}$, C(0,3) = $-5.1030 \times 10^{-6}$, C(4,0) = $1.8218 \times 10^{-7}$,
C(2,2) = $-9.2302 \times 10^{-8}$, C(0,4) = $1.8903 \times 10^{-7}$, C(4,1) = $-3.4450 \times 10^{-9}$,
C(2,3) = $8.9824 \times 10^{-9}$, C(0,5) = $9.3692 \times 10^{-10}$, C(6,0) = $-1.5958 \times 10^{-11}$,
C(4,2) = $8.7755 \times 10^{-11}$, C(2,4) = $-1.7774 \times 10^{-10}$, C(0,6) = $-4.4660 \times 10^{-11}$,
C(6,1) = $4.1808 \times 10^{-13}$, C(4,3) = $-2.4108 \times 10^{-12}$, C(2,5) = $1.6975 \times 10^{-12}$,
C(0,7) = $3.9188 \times 10^{-13}$, C(8,0) = $7.5582 \times 10^{-16}$, C(6,2) = $-5.5138 \times 10^{-15}$,
C(4,4) = $3.6069 \times 10^{-14}$, C(2,6) = $-1.0551 \times 10^{-14}$, C(0,8) = $-5.6557 \times 10^{-16}$,
C(8,1) = $-2.1197 \times 10^{-17}$, C(6,3) = $5.0871 \times 10^{-17}$, C(4,5) = $-2.6528 \times 10^{-16}$,
C(2,7) = $5.2233 \times 10^{-17}$, C(0,9) = $-1.0050 \times 10^{-17}$, C(10,0) = $5.3335 \times 10^{-21}$,
C(8,2) = $1.3706 \times 10^{-19}$, C(6,4) = $-2.2646 \times 10^{-19}$, C(4,6) = $7.7225 \times 10^{-19}$,
C(2,8) = $-1.4943 \times 10^{-19}$, C(0,10) = $4.4049 \times 10^{-20}$

[Object Height (x,y) . . . Object Height of Primary Image Surface (I1) Side (mm)]

P1:( 0.000, 0.000), P2:( 0.000, 4.800), P3:( 0.000,−4.800),
P4:( 4.250, 4.800), P5:( 4.250, 0.000), P6:( 4.250,−4.800),
P7:( 8.500, 4.800), P8:( 8.500, 0.000), P9:( 8.500,−4.800)

[Example 2]

| | | | | |
|---|---|---|---|---|
| s0(I1) | r0 = ∞ | | | |
| | | d0 = 9.034 | | |
| (PR) . . . | | | | |
| s1 | r1 = ∞ | | | |
| | | d1 = 35.000 | N1 = 1.516800 | ν1 = 64.1988 |
| s2 | r2 = ∞ | | | |
| (GL) . . . | | | | |
| s3 | r3 = −124.304 | | | |
| | XDE = 0.000, YDE = 7.740, ZDE = 43.000 | | | |
| | ADE = 0.000, BDE = 0.000, CDE = 0.000 | | | |
| | | d3 = 15.000 | N2 = 1.846660 | ν2 = 23.8200 |
| s4 | r4 = −78.008 | | | |
| | | d4 = 7.976 | | |
| s5 | r5 = 129.978 | | | |
| | | d5 = 9.500 | N3 = 1.798500 | ν3 = 22.6000 |
| s6 | r6 = −134.564 | | | |
| | | d6 = 43.634 | | |
| s7 | r7 = −64.381 | | | |
| | | d7 = 3.000 | N4 = 1.845626 | ν4 = 23.7940 |
| s8 | r8 = 66.462 | | | |
| | | d8 = 9.200 | N5 = 1.487490 | ν5 = 70.4465 |
| s9 | r9 = −72.787 | | | |
| | | d9 = 0.100 | | |
| s10 | r10 = 141.179 | | | |
| | | d10 = 9.200 | N6 = 1.754500 | ν6 = 51.5700 |
| s11 | r11 = −36.331 | | | |
| | | d11 = 3.000 | N7 = 1.760263 | ν7 = 23.8785 |
| s12 | r12 = −354.830 | | | |
| | | d12 = 0.100 | | |
| s13(ST) | r13 = ∞ (Radius of aperture = 17.888 mm) | | | |
| | | d13 = 101.294 | | |
| s14 | r14 = −576.500 | | | |
| | | d14 = 10.000 | N8 = 1.798500 | ν8 = 22.6000 |
| s15 | r15 = −114.448 | | | |
| | | d15 = 0.100 | | |
| s16 | r16 = 105.343 | | | |
| | | d16 = 12.00 | N9 = 1.806831 | ν9 = 44.2191 |
| s17 | r17 = 681.514 | | | |
| | | d17 = 29.335 | | |
| s18 | r18 = 53.589 | | | |
| | | d18 = 13.372 | N10 = 1.850000 | ν10 = 40.0400 |
| s19 | r19 = 40.687 | | | |
| | | d19 = 14.351 | | |
| s20 | r20 = −55.714 | | | |
| | | d20 = 4.000 | N11 = 1.772677 | ν11 = 32.5368 |
| s21 | r21 = 69.967 | | | |
| | | d21 = 22.058 | | |
| s22 | r22 = −29.217 | | | |
| | | d22 = 5.000 | N12 = | ν12 = 51.5700 |

-continued

| [surface] | [Radius of Curvature] | [Axial Distance] | [Refractive Index] | [Abbe Number] |
|---|---|---|---|---|
| s23 | r23 = −72.564 | | 1.754500 | |
| | | d23 = 0.940 | | |
| s24 | r24 = −179.539 | | | |
| | | d24 = 24.200 | N13 = 1.493100 | v13 = 83.5763 |
| s25 | r25 = −51.309 | | | |
| | | d25 = 0.100 | | |
| s26 | r26 = −160.153 | | | |
| | | d26 = 10.510 | N14 = 1.754500 | v14 = 51.5700 |
| s27 | r27 = −95.833 | | | |
| s28(M1) | r28 = ∞ | | | |
| | XDE = 0.000,YDE = 7.740,ZDE = 442.970 | | | |
| | ADE = 0.000,BDE = −45.000,CDE = 0.000 | | | |
| s29$(M2) | r29 = −46.883 | | | |
| | XDE = −178.000,YDE = 7.740,ZDE = 442.970 | | | |
| | ADE = −90.000,BDE = −71.417,CDE = −90.000 | | | |
| s30(M3) | r30 = ∞ | | | |
| | XDE = 37.000,YDE = 7.740,ZDE = 442.970 | | | |
| | ADE = 0.000,BDE = −90.000,CDE = 0.000 | | | |
| s31 (I2) | r31 = ∞ | | | |
| | XDE = −213.000,YDE = 7.740,ZDE = 442.970 | | | |
| | ADE = 0.000,BDE = −90.000,CDE = 0.000 | | | |

[Free Form Surface Data of 29th Surface (s29)]

$K = -1.3269$,
$C(0,1) = -3.5062 \times 10^{-1}, C(2,0) = 6.2489 \times 10^{-3}, C(0,2) = 6.3717 \times 10^{-3}$,
$C(2,1) = -2.2344 \times 10^{-7}, C(0,3) = -1.9720 \times 10^{-5}, C(4,0) = -1.0124 \times 10^{-7}$,
$C(2,2) = -4.4762 \times 10^{-7}, C(0,4) = 5.6942 \times 10^{-8}, C(4,1) = -2.2517 \times 10^{-10}$,
$C(2,3) = 5.1671 \times 10^{-9}, C(0,5) = -4.2388 \times 10^{-10}, C(6,0) = -3.1929 \times 10^{-13}$,
$C(4,2) = 2.0656 \times 10^{-11}, C(2,4) = -3.2830 \times 10^{-11}, C(0,6) = 72846 \times 10^{-12}$,
$C(6,1) = 6.4603 \times 10^{-15}, C(4,3) = -1.7559 \times 10^{-13}, C(2,5) = 6.9835 \times 10^{-14}$,
$C(0,7) = -7.3114 \times 10^{-14}, C(8,0) = 1.4713 \times 10^{-16}, C(6,2) = -9.8759 \times 10^{-17}$,
$C(4,4) = 4.7420 \times 10^{-16}, C(2,6) = 2.0744 \times 10^{-16}, C(0,8) = 2.5502 \times 10^{-16}$

[Object Height (x,y) ... Object Height of Primary Image Surface (I1) Side (mm)]

P1:( 0.000, 0.000),P2:( 0.000, 4.458),P3:( 0.000,−4.458),
P4:( 3.923, 4.458),P5:( 3.923, 0.000),P6:( 3.923,−4.458),
P7:( 7.845, 4.458),P8:( 7.845, 0.000),P9:( 7.845,−4.458)

[Example 3]

| surface | Radius | Axial Distance | Refractive Index | Abbe Number |
|---|---|---|---|---|
| s0(I1) | r0 = ∞ | | | |
| | | d0 = 9.842 | | |
| (PR) ... | | | | |
| s1 | r1 = ∞ | | | |
| | | d1 = 35.000 | N1 = 1.516800 | v1 = 64.1988 |
| s2 | r2 = ∞ | | | |
| (GL) ... | | | | |
| s3 | r3 = −152.335 | | | |
| | XDE = 0.000,YDE = 8.254,ZDE = 49.283 | | | |
| | ADE = 0.000,BDE = 0.000,CDE = 0.000 | | | |
| | | d3 = 5.456 | N2 = 1.798500 | v2 = 22.6000 |
| s4 | r4 = −74.243 | | | |
| | | d4 = 0.876 | | |
| s5 | r5 = 88.216 | | | |
| | | d5 = 7.115 | N3 = 1.798500 | v3 = 22.6000 |
| s6 | r6 = −164.239 | | | |
| | | d6 = 29.861 | | |
| s7 | r7 = −157.747 | | | |
| | | d7 = 1.420 | N4 = 1.847190 | v4 = 25.6167 |
| s8 | r8 = 30.384 | | | |
| | | d8 = 5.778 | N5 = 1.487490 | v5 = 70.4465 |
| s9 | r9 = −146.737 | | | |
| | | d9 = 1.169 | | |
| s10 | r10 = 79.274 | | | |
| | | d10 = 6.844 | N6 = 1.803020 | v6 = 44.6552 |
| s11 | r11 = −25.484 | | | |
| | | d11 = 10.774 | N7 = 1.798410 | v7 = 22.6000 |
| s12 | r12 = 156.712 | | | |
| | | d12 = 3.432 | | |
| s13(ST) | r13 = ∞(Radius of aperture = 11.7845 mm) | | | |
| | | d13 = 52.664 | | |
| s14 | r14 = −67.472 | | | |
| | | d14 = 11.340 | N8 = 1.711910 | v8 = 27.5673 |
| s15 | r15 = −50.953 | | | |
| | | d15 = 1.231 | | |
| s16 | r16 = 99.005 | | | |
| | | d16 = 14.486 | N9 = 1.661310 | v9 = 40.7016 |

-continued

| [surface] | [Radius of Curvature] | [Axial Distance] | [Refractive Index] | [Abbe Number] |
|---|---|---|---|---|
| s17 | r17 = −184.967 | | | |
| | | d17 = 1.252 | | |
| s18 | r18 = 62.875 | | | |
| | | d18 = 25.809 | N10 = 1.849000 | v10 = 33.3804 |
| s19 | r19 = 54.318 | | | |
| | | d19 = 10.495 | | |
| s20 | r20 = −107.429 | | | |
| | | d20 = 2.962 | N11 = 1.850000 | v11 = 40.0400 |
| s21 | r21 = 68.357 | | | |
| | | d21 = 17.644 | | |
| s22 | r22 = −25.867 | | | |
| | | d22 = 2.984 | N12 = 1.491400 | v12 = 59.9268 |
| s23* | r23 = −30.608 | | | |
| s24(M1) | r24 = ∞ | | | |
| | XDE = 0.000,YDE = 8.254,ZDE = 292.904 | | | |
| | ADE = 0.000,BDE = −45.000,CDE = 0.000 | | | |
| (G1) . . . | | | | |
| s25 | r25 = 61.332 | | | |
| | XDE = −71.363,YDE = 7.298,ZDE = 292.904 | | | |
| | ADE = 0.000,BDE = −90.000,CDE = 0.000 | | | |
| | | | N13 = 1.491400 | v13 = 59.9268 |
| s26* | r26 = 206.494 | | | |
| | XDE = −73.933,YDE = 7.298,ZDE = 292.908 | | | |
| | ADE = 0.000,BDE = −90.000,CDE = 0.000 | | | |
| s27$(M2) | r27 = −133.804 | | | |
| | XDE = −168.026,YDE = 57.604,ZDE = 292.904 | | | |
| | ADE = 90.000,BDE = −79.656,CDE = 90.000 | | | |
| s28(M3) | r28 = ∞ | | | |
| | XDE = 36.810,YDE = 250.250,ZDE = 292.9040 | | | |
| | ADE = 90.000,BDE = −89.045,CDE = 90.000 | | | |
| s29(I2) | r29 = ∞ | | | |
| | XDE = −190.778,YDE = 413.403,ZDE = 292.904 | | | |
| | ADE = 0.000,BDE = −90.000,CDE = 0.000 | | | |

[Aspherical Data of 23rd Surface (s23)]

$K = 0.000000$,
$A = 0.214465 \times 10^{-5}, B = 0.671861 \times 10^{-9}, C = 0.432050 \times 10^{-12}$

[Aspherical Data of 26th Surface (s26)]

$K = 0.000000$,
$A = 0.127518 \times 10^{-5}, B = -0.167103 \times 10^{-9}, C = 0.261979 \times 10^{-13}$

[Free Form Surface Data of 27th Surface (s27)]

$K = -1.0724$,
$C(2,0) = 1.9959 \times 10^{-3}, C(0,2) = 2.4902 \times 10^{-3}, C(2,1) = 9.8790 \times 10^{-6}$,
$C(0,3) = 6.5829 \times 10^{-6}, C(4,0) = 4.9089 \times 10^{-8}, C(2,2) = 8.3849 \times 10^{-9}$,
$C(0,4) = 9.2711 \times 10^{-9}, C(4,1) = -5.8570 \times 10^{-10}, C(2,3) = -2.5838 \times 10^{-10}$,
$C(0,5) = -7.7201 \times 10^{-11}, C(6,0) = -2.8209 \times 10^{-12}, C(4,2) = 2.4518 \times 10^{-12}$,
$C(2,4) = -5.1310 \times 10^{-12}, C(0,6) = -3.9190 \times 10^{-12}, C(6,1) = 2.7897 \times 10^{-14}$,
$C(4,3) = -4.5394 \times 10^{-14}, C(2,5) = 6.7944 \times 10^{-14}, C(0,7) = 2.0762 \times 10^{-14}$,
$C(8,0) = 8.9760 \times 10^{-17}, C(4,4) = 4.3965 \times 10^{-16}, C(0,8) = 8.2880 \times 10^{-17}$

[Object Height (x,y) . . . Object Height of Primary Image Surface (I1) Side (mm)]

P1:( 0.000, 0.000),P2:( 0.000, 4.800),P3:( 0.000,−4.800),
P4:( 4.250, 4.800),P5:( 4.250, 0.000),P6:( 4.250,−4.800),
P7:( 8.500, 4.800),P8:( 8.500, 0.000),P9:( 8.500,−4.800)

[Example 4]

| | | | | |
|---|---|---|---|---|
| s0(I1) | r0 = ∞ | | | |
| | | d0 = 9.842 | | |
| (PR) . . . | | | | |
| s1 | r1 = ∞ | | | |
| | | d1 = 35.000 | N1 = 1.516800 | v1 = 64.1988 |
| s2 | r2 = ∞ | | | |
| (GL) . . . | | | | |
| s3 | r3 = −131.104 | | | |
| | XDE = 0.000,YDE = 7.292,ZDE = 38.340 | | | |
| | ADE = −0.393,BDE = 0.000,CDE=0.000 | | | |
| | | d3 = 11.729 | N2 = 1.798500 | v2 = 22.6000 |
| s4 | r4 = −64.802 | | | |
| | | d4 = 0.876 | | |
| s5 | r5 = 76.511 | | | |
| | | d5 = 6.570 | N3 = 1.798500 | v3 = 22.6000 |
| s6 | r6 = −199.490 | | | |

-continued

| [surface] | [Radius of Curvature] | [Axial Distance] | [Refractive Index] | [Abbe Number] |
|---|---|---|---|---|
| s7 | r7 = −60.723 XDE = 0.000,YDE = 7.629,ZDE = 91.756 ADE = 0.000,BDE = 0.000,CDE = 0.000 | d7 = 1.411 | N4 = 1.846600 | ν4 = 23.8200 |
| s8 | r8 = 32.893 | d8 = 4.823 | N5 = 1.487490 | ν5 = 70.4465 |
| s9 | r9 = −84.430 | d9 = 1.167 | | |
| s10 | r10 = 82.154 | d10 = 5.596 | N6 = 1.780010 | ν6 = 47.5812 |
| s11 | r11 = −24.747 | d11 = 1.676 | N7 = 1.798500 | ν7 = 22.6000 |
| s12 | r12 = 3481.360 | | | |
| s13(ST) | r13 = ∞(Radius of aperture = 10.835 mm) XDE = 0.000,YDE = 6.786,ZDE = 106.577 ADE = 0.000,BDE = 0.000,CDE = 0.000 | | | |
| s14 | r14 = −234.348 XDE = 0.000,YDE = 7.891,ZDE = 157.478 ADE = 0.000,BDE = 0.000,CDE = 0.000 | d14 = 12.921 | N8 = 1.844180 | ν8 = 40.5333 |
| s15 | r15 = −65.833 | d15 = 1.055 | | |
| s16 | r16 = 67.991 | d16 = 10.051 | N9 = 1.849190 | ν9 = 34.4777 |
| s17 | r17 = 43883.560 | | | |
| s18 | r18 = 49.740 XDE = 0.000,YDE = 7.7135,ZDE = 182.795 ADE = 0.000,BDE = 0.000,CDE = 0.000 | d18 = 11.579 | N10 = 1.850000 | ν10 = 40.0400 |
| s19 | r19 = 50.385 | d19 = 6.406 | | |
| s20 | r20 = 841.039 | d20 = 1.793 | N11 = 1.691580 | ν11 =43.5065 |
| s21 | r21 = 30.970 | | | |
| s22 | r22 = −28.663 XDE = 0.000,YDE = 7.596,ZDE = 218.039 ADE = 0.000,BDE = 0.000,CDE = 0.000 | d22 = 1.936 | N12 = 1.491400 | ν12 = 59.9268 |
| s23* | r23 = −50.357 | d23 = 1.944 | | |
| s24 | r24 = −67.304 | d24 = 1.875 | N13 = 1.491400 | ν13 = 59.9268 |
| s25* | r25 = 308.760 | | | |
| s26(M1) | r26 = ∞ XDE = 0.000,YDE = 7.596,ZDE = 258.794 ADE = 0.000,BDE = −45.000,CDE = 0.000 | | | |
| s27$(M2) | r27 = −90.211 XDE = −139.254,YDE = −22.888,ZDE = 258.794 ADE = −90.000,BDE = −74.113,CDE = −90.000 | | | |
| s28(M3) | r28 = ∞ XDE = 28.656,YDE = 500.000,ZDE = 258.794 ADE = 90.000,BDE = −88.809,CDE = 90.000 | | | |
| s29(I2) | r29 = ∞ XDE = −162.560,YDE = 326.646,ZDE = 258.794 ADE = 0.000,BDE = −90.000,CDE = 0.000 | | | |

[Aspherical Data of 2t3rd Surface (s23)]

$K = 0.000000$,
$A = 0.480604 \times 10^{-5}, B = 0.191320 \times 10^{-8}$

[Aspherical Data of 25th Surface (s25)]

$K = 0.000000$,
$A = -0.518080 \times 10^{-5}, B = 0.499961 \times 10^{-9}$

[Free Form Surface Data of 27th Surface (s27)]

$K = -1.1662$,
$C(2,0) = 2.5207 \times 10^{-3}, C(0,2) = -1.8136 \times 10^{-3}, C(2,1) = -2.3329 \times 10^{-5}$,
$C(0,3) = 9.0655 \times 10^{-5}, C(4,0) = 3.3581 \times 10^{-7}, C(2,2) = 4.2322 \times 10^{-7}$,
$C(0,4) = -1.4625 \times 10^{-6}, C(4,1) = -2.6190 \times 10^{-9}, C(2,3) = 5.9888 \times 10^{-10}$,
$C(0,5) = 1.4008 \times 10^{-8}, C(6,0) = -3.8774 \times 10^{-11}, C(4,2) = 3.7303 \times 10^{-12}$,
$C(2,4) = -2.0503 \times 10^{-11}, C(0,6) = -5.9655 \times 10^{-11}, C(6,1) = 5.4681 \times 10^{-13}$,
$C(4,3) = -2.6378 \times 10^{-13}, C(2,5) = -4.7324 \times 10^{-14}, C(0,7) = 2.9438 \times 10^{-14}$,
$C(8,0) = 8.7080 \times 10^{-16}, C(6,2) = -3.7447 \times 10^{-15}, C(4,4) = 3.3758 \times 10^{-15}$,
$C(2,6) = 6.5795 \times 10^{-16}, C(0,8) = 3.3328 \times 10^{-16}, C(6,3) = 1.0859 \times 10^{-17}$,
$C(4,5) = -8.9597 \times 10^{-18}, C(4,6) = -1.7692 \times 10^{-20}$ -continued

| [surface] | [Radius of Curvature] | [Axial Distance] | [Refractive Index] | [Abbe Number] |
|---|---|---|---|---|

[Object Height (x,y) . . . Object Height of Primary Image Surface (I1) Side (mm)]

P1:( 0.000, 0.000),P2:( 0.000, 4.800),P3:( 0.000,−4.800),
P4:( 4.250, 4.800),P5:( 4.250, 0.000),P6:( 4.250,−4.800),
P7:( 8.500, 4.800),P8:( 8.500, 0.000),P9:( 8.500,−4.800)

[Example 5]

| s0(I1) | r0 = ∞ | | | |
|---|---|---|---|---|
| | | d0 = 9.500 | | |
| (PR) . . . | | | | |
| s1 | r1 = ∞ | | | |
| | | d1 = 36.000 | N1 = 1.805180 | v1 = 25.4321 |
| s2 | r2 = ∞ | | | |
| (GL) . . . | | | | |
| s3 | r3 = 136.535 | | | |
| | XDE = 0.000,YDE = 7.241,ZDE = 40.000 | | | |
| | ADE = 0.000,BDE = 0.000,CDE = 0.000 | | | |
| | | d3 = 7.500 | N2 = 1.798500 | v2 = 22.6000 |
| s4 | r4 = −79.913 | | | |
| | | d4 = 10.037 | | |
| s5 | r5 = 28.099 | | | |
| | | d5 = 10.000 | N3 = 1.493100 | v3 = 83.5763 |
| s6 | r6 = 133.356 | | | |
| | | d6 = 4.174 | | |
| s7 | r7 = 41.808 | | | |
| | | d7 = 5.000 | N4 = 1.492700 | v4 = 57.4912 |
| s8* | r8 = 21.252 | | | |
| | | d8 = 8.000 | | |
| s9 | r9 = −32.642 | | | |
| | | d9 = 3.000 | N5 = 1.769655 | v5 = 25.2700 |
| s10 | r10 = 20.462 | | | |
| | | d10 = 10.000 | N6 = 1.754500 | v6 = 51.5700 |
| s11 | r11 = −29.292 | | | |
| | | d11 = 0.100 | | |
| s12(ST) | r12 = ∞(Radius of aperture = 9.485 mm) | | | |
| | | d12 = 1.974 | | |
| s13 | r13 = −23.890 | | | |
| | | d13 = 3.000 | N7 = 1.708106 | v7 = 26.1543 |
| s14 | r14 = −41.620 | | | |
| | | d14 = 33.362 | | |
| s15 | r15 = −161.757 | | | |
| | | d15 = 9.000 | N8 = 1.849322 | v8 = 35.1881 |
| s16 | r16 = −47.765 | | | |
| | | d16 = 0.966 | | |
| s17 | r17 = 70.575 | | | |
| | | d17 = 10.000 | N9 = 1.754500 | v9 = 51.5700 |
| s18 | r18 = 255.425 | | | |
| | | d18 = 2.414 | | |
| s19 | r19 = 37.159 | | | |
| | | d19 = 10.000 | N10 = 1.850000 | v10 = 40.0400 |
| s20 | r20 = 27.689 | | | |
| | | d20 = 16.973 | | |
| s21 | r21 = −31.377 | | | |
| | | d21 = 5.000 | N11 = 1.492700 | v11 = 57.4912 |
| s22$ | r22 = 103.368 | | | |
| s23(M1) | r23 = ∞ | | | |
| | XDE = 0.000,YDE = 7.241,ZDE = 225.500 | | | |
| | ADE = 0.000,BDE = −45.000,CDE = 0.000 | | | |
| s24$(M2) | r24 = −271.305 | | | |
| | XDE = −170.000,YDE = 17.526,ZDE = 225.500 | | | |
| | ADE = 90.000,BDE = −84.319,CDE = 90.000 | | | |
| s25(M3) | r25 = ∞ | | | |
| | XDE = 35.000,YDE = 190.394,ZDE = 225.500 | | | |
| | ADE = 0.000,BDE = −90.000,CDE = 0.000 | | | |
| | | d25 = 200.000 | | |
| s26(I2) | r26 = ∞ | | | |
| | XDE = −205.000,YDE = 353.141,ZDE = 225.500 | | | |
| | ADE = 0.000,BDE = −90.000,CDE = 0.000 | | | |

[Aspherical Data of 8th Surface (s8)]

$K = 0.000000$,
$A = 0.100629 \times 10^{-4}, B = 0.254692 \times 10^{-7}, C = -0.251005 \times 10^{-10}$,
$D = 0.153156 \times 10^{-11}, E = -0.826340 \times 10^{-14}, F = 0.212717 \times 10^{-16}$ -continued

| [surface] | [Radius of Curvature] | [Axial Distance] | [Refractive Index] | [Abbe Number] |
|---|---|---|---|---|

[Free Form Surface Data of 22nd Surface (s22)]

$K = 0.0000$,
$C(0,1) = -1.6293 \times 10^{-3}, C(2,0) = 1.4426 \times 10^{-3}, C(0,2) = 1.4218 \times 10^{-3}$,
$C(2,1) = -4.2540 \times 10^{-7}, C(0,3) = -1.0891 \times 10^{-6}, C(4,0) = -2.2369 \times 10^{-6}$,
$C(2,2) = -3.8695 \times 10^{-6}, C(0,4) = -1.9139 \times 10^{-6}, C(4,1) = -9.8458 \times 10^{-9}$,
$C(2,3) = -1.8038 \times 10^{-8}, C(0,5) = -1.7215 \times 10^{-8}, C(6,0) = -4.3124 \times 10^{-10}$,
$C(4,2) = -5.3673 \times 10^{-9}, C(2,4) = -8.7969 \times 10^{-9}, C(0,6) = -1.1734 \times 10^{-9}$,
$C(6,1) = 2.5255 \times 10^{-11}, C(4,3) = 4.5351 \times 10^{-10}, C(2,5) = 5.6502 \times 10^{-10}$,
$C(0,7) = 5.4844 \times 10^{-11}, C(8,0) = -6.7494 \times 10^{-13}, C(6,2) = 3.0994 \times 10^{-12}$,
$C(4,4) = -1.3060 \times 10^{-11}, C(2,6) = -9.2514 \times 10^{-12}, C(0,8) = -5.0474 \times 10^{-13}$

[Free Form Surface Data of 24th Surface (s24)]

$K = -8.6243 \times 10^{-1}$
$C(0,1) = 4.7937 \times 10^{-2}, C(2,0) = -8.2792 \times 10^{-4}, C(0,2) = -6.5377 \times 10^{-4}$,
$C(2,1) = 9.6203 \times 10^{-6}, C(0,3) = -8.2822 \times 10^{-8}, C(4,0) = 1.6468 \times 10^{-7}$,
$C(2,2) = 1.6006 \times 10^{-7}, C(0,4) = 4.6783 \times 10^{-7}, C(4,1) = -1.8822 \times 10^{-9}$,
$C(2,3) = 6.9203 \times 10^{-10}, C(0,5) = -1.0444 \times 10^{-8}, C(6,0) = -2.1145 \times 10^{-11}$,
$C(4,2) = 3.6043 \times 10^{-12}, C(2,4) = -5.7242 \times 10^{-11}, C(0,6) = 1.5134 \times 10^{-10}$,
$C(6,1) = 3.6092 \times 10^{-13}, C(4,3) = -3.1945 \times 10^{-14}, C(2,5) = 6.4981 \times 10^{-13}$,
$C(0,7) = -1.3725 \times 10^{-12}, C(8,0) = 3.1830 \times 10^{-15}, C(6,2) = -3.9355 \times 10^{-15}$,
$C(4,4) = -1.1713 \times 10^{-15}, C(2,6) = -2.2471 \times 10^{-15}, C(0,8) = 5.6943 \times 10^{-15}$,
$C(8,1) = -3.6162 \times 10^{-17}, C(6,3) = 1.3316 \times 10^{-17}, C(4,5) = 6.1204 \times 10^{-17}$,
$C(2,7) = -2.0287 \times 10^{-17}, C(0,9) = 7.4268 \times 10^{-18}, C(10,0) = -2.4438 \times 10^{-19}$,
$C(8,2) = 5.3480 \times 10^{-19}, C(6,4) = 2.4708 \times 10^{-19}, C(4,6) = -3.6337 \times 10^{-19}$,
$C(2,8) = 1.7291 \times 10^{-19}, C(0,10) = -1.0876 \times 10^{-19}$

[Object Height (x,y) . . . Object Height of Primary Image Surface (I1) Side (mm)]

P1:( 0.000, 0.000),P2:( 0.000, 4.800),P3:( 0.000,-4.800),
P4:( 4.250, 4.800),P5:( 4.250, 0.000),P6:( 4.250,-4.800),
P7:( 8.500, 4.800),P8:( 8.500, 0.000),P9:( 8.500,-4.800)

[Example 6]

| | | | | |
|---|---|---|---|---|
| s0(I1) | r0 = ∞ | | | |
| | | d0 = 13.076 | | |
| (PR) . . . | | | | |
| s1 | r1 = ∞ | | | |
| | | d1 = 25.000 | N1 = 1.516800 | v1 = 64.1988 |
| s2 | r2 = ∞ | | | |
| (GL) . . . | | | | |
| s3 | r3 = −212.523 | | | |
| | XDE = 0.000,YDE = 7.387,ZDE = 53.491 | | | |
| | ADE = 0.000,BDE = 0.000,CDE = 0.000 | | | |
| | | d3 = 15.000 | N2 = 1.798500 | v2 = 22.6000 |
| s4 | r4 = −91.328 | | | |
| | | d4 = 5.073 | | |
| s5 | r5 = 101.658 | | | |
| | | d5 = 8.253 | N3 = 1.798500 | v3 = 22.6000 |
| s6 | r6 = −337.336 | | | |
| | | d6 = 37.063 | | |
| s7 | r7 = −181.840 | | | |
| | | d7 = 3.000 | N4 = 1.784781 | v4 = 24.9442 |
| s8 | r8 = 42.090 | | | |
| | | d8 = 0.100 | | |
| s9 | r9 = 41.613 | | | |
| | | d9 = 8.860 | N5 = 1.493100 | v5 = 83.5763 |
| s10 | r10 = −174.263 | | | |
| | | d10 = 0.100 | | |
| s11 | r11 = 85.332 | | | |
| | | d11 = 9.083 | N6 = 1.754500 | v6 = 51.5700 |
| s12 | r12 = −48.862 | | | |
| | | d12 = 3.002 | N7 = 1.814040 | v7 = 22.9953 |
| s13 | r13 = 298.705 | | | |
| | | d13 = 11.664 | | |
| s14(ST) | r14 = ∞(Radius of aperture = 18.187 mm) | | | |
| s15 | r15 = −1597.872 | | | |
| | XDE = 0.000,YDE = 7.035,ZDE = 254.725 | | | |
| | ADE = 0.000,BDE = 0.000,CDE = 0.000 | | | |
| | | d15 = 8.173 | N8 = 1.846829 | v8 = 24.3204 |
| s16 | r16 = −114.156 | | | |
| | | d16 = 0.100 | | |
| s17 | r17 = 63.694 | | | |
| | | d17 = 15.000 | N9 = 1.850000 | v9 = 40.0400 |
| s18 | r18 = 287.502 | | | |
| | | d18 = 2.182 | | |

-continued

| [surface] | [Radius of Curvature] | [Axial Distance] | [Refractive Index] | [Abbe Number] |
|---|---|---|---|---|
| s19 | r19 = −296.867 XDE = 0.000,YDE = 6.701,ZDE = 296.403 ADE = 0.000,BDE = 0.000,CDE = 0.000 | | | |
| | | d19 = 3.030 | N10 = 1.674344 | v10 = 28.1094 |
| s20 | r20 = 37.151 | | | |
| | | d20 = 18.590 | | |
| s21 | r21 = −32.120 | | | |
| | | d21 = 3.000 | N11 = 1.487490 | v11 = 70.4400 |
| s22 | r22 = 348.721 | | | |
| | | d22 = 23.977 | | |
| s23$ | r23 = −116.234 | | | |
| | | d23 = 15.000 | N12 = 1.492700 | v12 = 57.4912 |
| s24 | r24 = −61.570 | | | |
| s25(M1) | r25 = ∞ XDE = 0.000,YDE = 6.701,ZDE = 418.000 ADE = 0.000,BDE = −45.000,CDE = 0.000 | | | |
| s26$(M2) | r26 = −29.074 XDE = −172.000,YDE = 6.701,ZDE = 418.000 ADE = −90.000,BDE = −79.735,CDE = −90.000 | | | |
| s27(M3) | r27 = ∞ XDE = 43.000,YDE = 6.701,ZDE = 418.000 ADE = 0.000,BDE = −90.000,CDE = 0.000 | | | |
| s28(I2) | r28 = ∞ XDE = −207.000,YDE= 6.701,ZDE = 418.000 ADE = 0.000,BDE = −90.000,CDE = O.000 | | | |

[Free Form Surface Data of 23rd Surface (s23)]

K = 0.0000,
$C(0,1) = 3.9445 \times 10^{-3}, C(2,0) = -1.3570 \times 10^{-5}, C(0,2) = -3.4941 \times 10^{-5},$
$C(2,1) = 6.5031 \times 10^{-6}, C(0,3) = 1.2844 \times 10^{-5}, C(4,0) = 3.1301 \times 10^{-7},$
$C(2,2) = 1.7452 \times 10^{-7}, C(0,4) = -8.4504 \times 10^{-7}, C(4,1) = -2.9251 \times 10^{-9},$
$C(2,3) = 3.8928 \times 10^{-9}, C(0,5) = 5.7690 \times 10^{-8}, C(6,0) = 1.8827 \times 10^{-10},$
$C(4,2) = 1.2048 \times 10^{-9}, C(2,4) = 8.7235 \times 10^{-10}, C(0,6) = -1.6052 \times 10^{-9},$
$C(6,1) = -5.1612 \times 10^{-12}, C(4,3) = -2.2463 \times 10^{-11}, C(2,5) = -7.4469 \times 10^{-12},$
$C(0,7) = 3.1560 \times 10^{-11}, C(8,0) = 9.5453 \times 10^{-15}, C(6,2) = -7.0506 \times 10^{-14},$
$C(4,4) = 2.4618 \times 10^{-14}, C(2,6) = -9.6357 \times 10^{-14}, C(0,8) = -2.6819 \times 10^{-13}$

[Free Form Surface Data of 26th Surface (s26)]

K = −1.0702
$C(0,1) = -1.8285 \times 10^{-1}, C(2,0) = 1.3106 \times 10^{-2}, C(0,2) = 1.2815 \times 10^{-2},$
$C(2,1) = 5.0938 \times 10^{-6}, C(0,3) = 7.8850 \times 10^{-6}, C(4,0) = -7.8339 \times 10^{-8},$
$C(2,2) = -3.2166 \times 10^{-7}, C(0,4) = -2.8413 \times 10^{-7}, C(4,1) = -2.2027 \times 10^{-9},$
$C(2,3) = -1.0281 \times 10^{-9}, C(0,5) = 1.7065 \times 10^{-9}, C(6,0) = -5.0398 \times 10^{-12},$
$C(4,2) = 3.0970 \times 10^{-11}, C(2,4) = 1.7380 \times 10^{-11}, C(0,6) = -1.5040 \times 10^{-11},$
$C(6,1) = 1.1312 \times 10^{-13}, C(4,3) = -1.2207 \times 10^{-13}, C(2,5) = -2.7224 \times 10^{-14},$
$C(0,7) = 1.0179 \times 10^{-13}, C(8,0) = 1.3590 \times 10^{-16}, C(6,2) = -6.0907 \times 10^{-16},$
$C(4,4) = 1.3192 \times 10^{-16}, C(2,6) = -8.7560 \times 10^{-17}, C(0,8) = -2.6275 \times 10^{-16}$

[Object Height (x,y) . . . Object Height of Primary Image Surface (I1) Side (mm)]

P1:( 0.000, 0.000),P2:( 0.000, 4.458),P3:( 0.000,−4.458),
P4:( 3.923, 4.458),P5:( 3.923, 0.000),P6:( 3.923,−4.458),
P7:( 7.845, 4.458),P8:( 7.845, 0.000),P9:( 7.845,−4.458)

As explained above, using the present invention, a high-performance tilt projection optical system, which is sufficiently thin and easy to manufacture, may be implemented through the use of angled projection.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A tilt projection optical system that performs enlarged projection from a primary image plane on a reduction side of the tilt projection optical system to a second image plane on an enlargement side of the tilt projection optical system without forming an intermediate real image, while being located at an angled position, said tilt projection optical system comprising, sequentially from the primary image piano side:
   a refracting Ions group, including an aperture:
   a bending minor that rotates an optical axis for the tilt projection optical system after said bending mirror, and
   an optical group, including at least one reflective surface that has a negative power.

2. A tilt projection optical system in accordance with claim 1, wherein constriction of said tilt projection optical system is such that a radius of circle that encompasses all light rays involved in image formation on the second image plane and that is parallel to surfaces of each lens of the refracting lens group enlarges once and then converges in terms of its radius on the enlargement side from the aperture of the refracting lens group.

3. A tilt projection optical system in accordance with claim 2, wherein following condition is met:

$0.35 < Rmin/Rmax < 0.85$ where

Rmax is maximum value of a radius of a circle that encompasses all light rays involved in image formation on the second image plane and that is parallel to surfaces of each lens of the refracting lens group, the maximum value being obtained when said circle enlarges in terms of its radius once on the enlargement side from the aperture; arid Rmin is minimum value of the radius of the circle that encompasses all the light rays involved in the image formation on the second image plane and that is parallel to the surfaces of each lens of the refracting lens group, the minimum value being obtained on the enlargement side from a surface at which the maximum value Rmax is obtained.

4. A tilt projection optical system in accordance with claim 3, wherein the bending minor rotates the optical axis for the optical system after said bending mirror by approximately 90 degrees.

5. A tilt projection optical system in accordance with claim 4, wherein the reflective surface that has a negative power is located between said bending mirror and the second image plane and does not have an axis possessing rotational symmetry.

6. A tilt projection optical system in accordance with claim 4, wherein lenses of said refracting lens group share a same axis.

7. A tilt projection optical system in accordance with claim 4, wherein said refracting lens group includes on the second image plane side from the aperture a lens group that includes, sequentially from the primary image plane side: at least one positive lens, a lens having a concave surface on the enlargement side thereof, and a negative lens that is located next to said concave surface and has a concave surface on a reduction side thereof.

8. A tilt projection optical system in accordance with claim 4, wherein a surface that is not rotationally symmetrical is included in said refracting lens group.

9. A tilt projection optical system in accordance with claim 4, wherein following condition is met:

$0.70 < La/Lt < 0.93$ where:

La is a distance from a screen center position of the primary image plane and a screen center position of the second image plane extending along a short edge of screen of second image plane; and Lt is a length of the short edge of the screen of the second image plane.

10. A tilt projection optical system in accordance with claim 4, wherein when a light ray that reaches a center of a screen at the second image plane from a center of a screen at the primary image plane via a center of the aperture is deemed to be a screen center light, a following condition is met:

$0.30 < OP1/OP2 < 0.45$ where:

OP1 is a length of a light path of the screen center light that begins from a surface, which is included in the refracting lens group and is closest to the bending mirror, and extends to a negative power reflective surface of said at least one reflective surface that has a negative power; and OP2 is a length of a light path of the screen center light that begins from said negative power reflective surface and extends to the second image plane.

11. A tilt projection optical system in accordance with claim 1, wherein the reflective surface that has a negative power is located between said bending minor and the second image plane and does not have an axis possessing rotational symmetry.

12. A tilt projection optical system in accordance with claim 1, wherein lenses of said refracting lens group share a same axis.

13. A tilt projection optical system in accordance with claim 1, wherein said refracting lens group includes on the second image plane side from the aperture a lens group that includes, sequentially from the primary image plane side: at least one positive lens, a lens having a concave surface on the enlargement side thereof, and a negative lens that is located next to said concave surface and has a concave surface on a reduction side thereof.

14. A tilt projection optical system in accordance with claim 1, wherein a surface that is not rotationally symmetrical is included in said refracting lens group.

15. A tilt projection optical system in accordance with claim 1, wherein following condition is met:

$0.70 < La/Lt < 0.93$ where:

La is a distance from a screen center position of the primary image plane and a screen center position of the second image plane extending along a short edge of screen of second image plane; and Lt is a length of the short edge of the screen of the second image plane.

16. A tilt projection optical system in accordance with claim 1, wherein when a light ray that roaches a center of a screen at the second image plane from a center of a screen at the primary image plane via a center of the aperture is deemed to be a screen center light a following condition is met:

$0.30 < OP1/OP2 < 0.45$ where:

OP1 is a length of a light path of the screen center light that begins from a surface, which is included in the refracting lens group and is least to the bending mirror, and extends to a negative power reflective surface of said at least one reflective surface that has a negative power; and OP2 is a length of a light path of the screen center light that begins from said negative power reflective surface and extends to the second image plane.

17. A first projection optical system that performs enlarged projection from a primary image plane on a reduction side of the tilt projection optical system to a second image plane on an enlargement side of the tilt projection optical system without forming an intermediate real image, said tilt projection optical system comprising, sequentially from the primary image plane side:

a refracting lens group, including an aperture;

a bending mirror that rotates an optical axis for the tilt projection optical system after said bending mirror; and an optical group, including at least one reflective surface that has a negative power.

18. A tilt projection optical system in accordance with claim 17, wherein construction of said tilt projection optical system is such that a radius of circle that encompasses all light rays involved in image formation on the second image plane and that is parallel to surfaces of each lens of the refracting lens group enlarges once and then converges in terms of its radius on the enlargement side from the aperture of the refracting lens group.

19. A tilt projection optical system in accordance with claim 18, wherein following condition is met:

$$0.35 < Rmin/Rmax < 0.85$$

where:

Rmax is maximum value of a radius of a circle that encompasses all light rays involved in image formation on the second image plane and that is parallel to surfaces of each lens of the refracting lens group, the maximum value being obtained when said circle enlarges in terms of its radius once on the enlargement side from the aperture; and Rmin is minimum value of the radius of the circle that encompasses all the light rays involved in the image formation on the second image plane and that is parallel to the surfaces of each lens of the refracting lens group, the minimum value being obtained on the enlargement side from a surface at which the maximum value Rmax is obtained.

20. A tilt projection optical system in accordance with claim 19, wherein the bending mirror rotates the optics axis for the optical system after said bending minor by approximately 90 degrees.

21. A tilt projection optical system in accordance with claim 20, wherein the reflective surface that has a negative power is located between said bending minor and the second image plane and does not have an axis possessing rotational 22. A tilt projection optical system in accordance with claim 20, wherein lenses of said refracting lens group share a same axis.

23. A tilt projection optical system in accordance with claim 20, wherein said refracting lens group includes on the second image plane side from the aperture a lens group that includes, sequentially from the primary image plane side: at least one positive lens, a lens having a concave surface on the enlargement side thereof, and a negative lens that is located next to said concave surface and has a concave surface on a reduction side thereof.

24. A tilt projection optical system in accordance with claim 20, wherein a surface that is not rotationally symmetrical is included in said refracting lens group.

25. A tilt projection optical system in accordance with claim 20, wherein following condition is met:

$$0.70 < La/Lt < 0.93$$

where:

La is a distance from a screen center position of the primary image plane and a screen center position of the second image plane extending along a short edge of screen of second image plane: and Lt is a length of the short edge of the screen of the second image plane.

26. A tilt projection optical system in accordance with claim 20, wherein when a light ray that reaches a center of a screen at the second image plane from a center of a screen at the primary image plane via a center of the aperture is deemed to be a screen center light, a following condition is met:

$$0.30 < OP1/OP2 < 0.45$$

where:

OP1 is a length of a light path of the screen center light that begins from a surface, which is included in the refracting lens group and is closest to the bonding mirror, and extends to a negative power reflective surface of said at least one reflective surface that has a negative power; and OP2 is a length of a light path of the screen center light that begins from said negative power reflective surface and extends to the second image plane.

27. A tilt projection optical system in accordance with claim 17, wherein the reflective surface that has a negative power is located between said bonding mirror and the second image plane and does not have an axis possessing rotational symmetry.

28. A tilt projection optical system in accordance with claim 17, wherein lenses of said refracting lens group share a same axis.

29. A tilt projection optical system in accordance with claim 17, wherein said refracting lens group includes on the second image plane side from the aperture a lens group that includes, sequentially from the primary image plane side: at least one positive lens, a lens having a concave surface on the enlargement side thereof, and a negative lens that is located next to said concave surface and has a concave surface on a reduction side thereof.

30. A tilt projection optical system in accordance with claim 17, wherein a surface that is not rotationally symmetrical is included in said refracting lens group.

31. A tilt projection optical system in accordance with claim 17, wherein following condition is met:

$$0.70 < La/Lt < 0.93$$

where:

La is a distance from a screen center position of the primary image plane and a screen center position of the second image plane extending along a short edge of screen of second image plane; and Lt is a length of the short edge of the screen of the second image plane.

32. A tilt projection optical system in accordance with claim 17, wherein when a light ray that reaches a center of a screen at the second image plane from a center of a screen at the primary image plane via a center of the aperture is deemed to be a screen center light, a following condition is met:

$$0.30 < OP1/OP2 < 0.45$$

where:

OP1 is a length of a light path of the screen center light that begins from a surface, which is included in the refracting lens group and is closest to the bending mirror, and extends to a negative power reflective surface of said at least one reflective surface that has a negative power; and OP2 is a length of a light path of the screen center light that begins from said negative power reflective surface and extends to the second image plane.

33. A tilt projection optical system that performs enlarged projection from a primary image plane on a reduction side of the till projection optical system to a second image plane on an enlargement aide of the tilt projection optical system without forming an intermediate real image, while being located at an angled position with respect to the second image plane, said tilt projection optical system comprising, sequentially from the primary image plane side:
  a refracting lens group, including an aperture;
  a bending mirror that rotates an optical axis for the tilt projection optical system after said bending mirror; and
  an optical group, including at least one reflective surface that has a negative power.

34. A tilt projection optical system in accordance with claim 33, wherein construction of said tilt projection optical system is such that a radius of circle that encompasses all light rays involved in image formation on the second image plane and that is parallel to surfaces of each lens of the retracting lens group enlarges once and then converges in terms of its radius on the enlargement side from the aperture of the refracting lens group.

35. A tilt projection optical system in accordance with claim 34, wherein following condition is met:

$$0.35 < Rmin/Rmax < 0.85$$

where:
Rmax is maximum value of a radius of a circle that encompasses all light rays involved in image formation on the second image plane and that is parallel to surfaces of each lens of the refracting lens group, the maximum value being obtained when said circle enlarges in terms of its radius once on the enlargement side from the aperture; and
Rmin is minimum value of the radius of the circle that encompasses all the light rays involved in the image formation on the second image plane and that is parallel to the surfaces of each lens of the refracting lens group, the minimum value being obtained on the enlargement side from a surface at which the maximum value Rmax is obtained.

36. A tilt projection optical system in accordance with claim 35, wherein the bending minor rotates the optical axis for the optical system after said bending mirror by approximately 90 degrees.

37. A tilt projection optical system in accordance with claim 36, wherein the reflective surface that has a negative power is located between said bending mirror and the second image plane and does not have an axis possessing rotational symmetry.

38. A tilt projection optical system in accordance with claim 36, wherein lenses of said refracting lens group share a same axis.

39. A tilt projection optical system in accordance with claim 36, wherein said refracting lens group includes on the second image plane side from, the aperture a lens group that includes, sequentially from the primary image plane side: at least one positive lens, a lens having a concave surface on the enlargement side thereof, and a negative lens that is located next to said concave surface and has a concave surface on a reduction side thereof.

40. A tilt projection optical system in accordance with claim 36, wherein a surface that is not rotationally symmetrical is included in said refracting lens group.

41. A tilt projection optical system in accordance with claim 36, wherein following condition is met:

$$0.70 < La/Lt < 0.93$$

where:
La is a distance from a screen center position of the primary image plane and a screen center position of the second image plane extending along a short edge of screen of second image plane; and
Lt is a length of the short edge of the screen of the second image plane.

42. A tilt projection optical system in accordance with claim 36, wherein when a light ray that reaches a center of a screen at the second image plane from a center of a screen at the primary image plane via a center of the aperture is deemed to be a screen center light, a following condition is met:

$$0.30 < OP1/OP2 < 0.45$$

where:
OP1 is a length of a light path of the screen center light that begins from a surface, which is included in the refracting lens group and is closest to the bending minor, and extends to a negative power reflective surface of said at least one reflective surface that has a negative power; and
OP2 is a length of a light path of the screen center tight that begins from said negative power reflective surface and extends to the second image plane.

43. A tilt projection optical system in accordance with claim 36, wherein the reflective surface that has a negative power is located between said bending mirror and the second image plane and does not have an axis possessing rotational symmetry.

44. A tilt projection optical system in accordance with claim 33, wherein lenses of said refracting lens group share a same axis.

45. A tilt projection optical system in accordance with claim 33, wherein said refracting lens group includes on the second image plane side from the aperture a lens group that includes, sequentially from the primary image plane side: at least one positive lens, a lens having a concave surface on the enlargement side thereof, and a negative Lens that is located next to said concave surface and has a concave surface on a reduction side thereof.

46. A tilt projection optical system in accordance with claim 33, wherein a surface that is not rotationally symmetrical is included in said refracting lens group.

47. A tilt projection optical system in accordance with claim 33, wherein following condition is met:

$$0.70 < La/Lt < 0.93$$

where:
La is a distance from a screen center position of the primary image plane and a screen center position of the second image plane extending along a short edge of screen of second image plane; and
Lt is a length of the short edge of the screen of the second image plane.

48. A tilt projection optical System in accordance wit claim 33, wherein when a light ray that reaches a center of a screen as the second image plane from a center of a screen at the primary image plane via a center of the aperture is deemed to be a screen center light, a following condition is met:

$$0.30 < OP1/OP2 < 0.45$$

where:

OP1 is a length of a light path of the screen center light that begins from a surface, which is included in the refracting lens group and is closest to the bending mirror, and extends to a negative power reflective surface of said at least one reflective surface that has a negative power; and OP2 is a length of a light path of the screen center light that begins from said negative power reflective surface and extends to the second image plane.

* * * * *

UNITED STATES PATENT AND TRADEMARK OFFICE
CERTIFICATE OF CORRECTION

PATENT NO. : 6,690,517 B2
DATED : February 10, 2004
INVENTOR(S) : Soh Ohzawa et al.

It is certified that error appears in the above-identified patent and that said Letters Patent is hereby corrected as shown below:

Column 24,
Line 52, delete "piano", and insert -- plane --.
Line 53, delete "Ions", and insert -- lens --.
Line 54, delete "minor", and insert -- mirror --.
Line 59, delete "constriction", and insert -- construction --.

Column 25,
Line 3, after "where", insert -- : --.
Line 11, delete "arid", and insert -- and --.
Line 19, delete "minor", and insert -- mirror --.

Column 26,
Line 10, delete "minor", and insert -- mirror --.
Line 41, delete "roaches", and insert -- reaches --.
Line 44, after "light", insert -- , --.
Line 53, delete "least", and insert -- closest --.
Line 60, delete "first", and insert -- tilt --.

Column 27,
Line 34, delete "optics", and insert -- optical --.
Line 35, delete "minor", and insert - mirror --.
Line 40, after "rotational", insert -- symmetry. --.
Line 65, after "plane", delete ":", and insert -- ; --.

Column 28,
Lines 14 and 23, delete "bonding", and insert -- bending --.

Column 29,
Line 8, delete "till", and insert -- tilt --.
Line 9, delete "aide", and insert -- side --.
Line 24, delete "retracting", and insert -- refracting --.
Line 49, delete "minor", and insert -- mirror --.
Line 62, after "from" delete ",".

Column 30,
Line 30, delete "minor", and insert -- mirror --.
Line 33, delete "tight", and insert -- light --.
Line 49, delete "Lens", and insert -- lens --.

UNITED STATES PATENT AND TRADEMARK OFFICE
CERTIFICATE OF CORRECTION

PATENT NO. : 6,690,517 B2
DATED : February 10, 2004
INVENTOR(S) : Soh Ohzawa et al.

It is certified that error appears in the above-identified patent and that said Letters Patent is hereby corrected as shown below:

<u>Column 31,</u>
Line 1, delete "System", and insert -- system --.
Line 1, delete "wit", and insert -- with --.
Line 3, delete "as", and insert -- at --.

Signed and Sealed this

Twenty-fourth Day of August, 2004

JON W. DUDAS
*Director of the United States Patent and Trademark Office*